United States Patent
Okawa

(10) Patent No.: US 10,191,244 B2
(45) Date of Patent: Jan. 29, 2019

(54) IMAGING APPARATUS AND POSITION DETECTION METHOD

(71) Applicant: Olympus Corporation, Hachioji-shi, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/815,570

(22) Filed: Nov. 16, 2017

(65) Prior Publication Data

US 2018/0143399 A1    May 24, 2018

(30) Foreign Application Priority Data

Nov. 18, 2016   (JP) .................................. 2016-224702

(51) Int. Cl.
| | |
|---|---|
| H04N 5/262 | (2006.01) |
| G02B 7/28 | (2006.01) |
| H04N 5/232 | (2006.01) |
| G02B 7/04 | (2006.01) |

(52) U.S. Cl.
CPC .............. *G02B 7/282* (2013.01); *G02B 7/04* (2013.01); *H04N 5/23212* (2013.01); *H04N 5/23245* (2013.01); *H04N 5/23296* (2013.01)

(58) Field of Classification Search
CPC ..................................................... G02B 7/04
See application file for complete search history.

(56) References Cited

U.S. PATENT DOCUMENTS

| | | | |
|---|---|---|---|
| 8,755,127 B2 * | 6/2014 | Kawada | G03B 3/10 359/694 |
| 2016/0116824 A1 * | 4/2016 | Okawa | G03B 13/34 396/81 |

FOREIGN PATENT DOCUMENTS

JP    2001-267903    9/2001

* cited by examiner

*Primary Examiner* — Gary C Vieaux
(74) *Attorney, Agent, or Firm* — John C. Pokotylo; Pokotylo Patent Services

(57) ABSTRACT

An imaging apparatus, comprising a detection element that outputs analog signals in accordance with position of the operation member, an A/D converter that converts the analog signals to digital values, and a controller that detects position of the operation member, wherein the controller, when it is determined that the operation member is stopped, compares an average value of a first number of digital values with a first threshold value, and determines that the operation member is moving if it has been determined that the average value is greater than the first threshold value, and when it is determined that the operation member is moving, compares a difference between a newest digital value and a digital value that was acquired a second number previously with a second threshold value, and determines that the operation member has stopped if it is determined that the difference is smaller than the second threshold value.

20 Claims, 15 Drawing Sheets

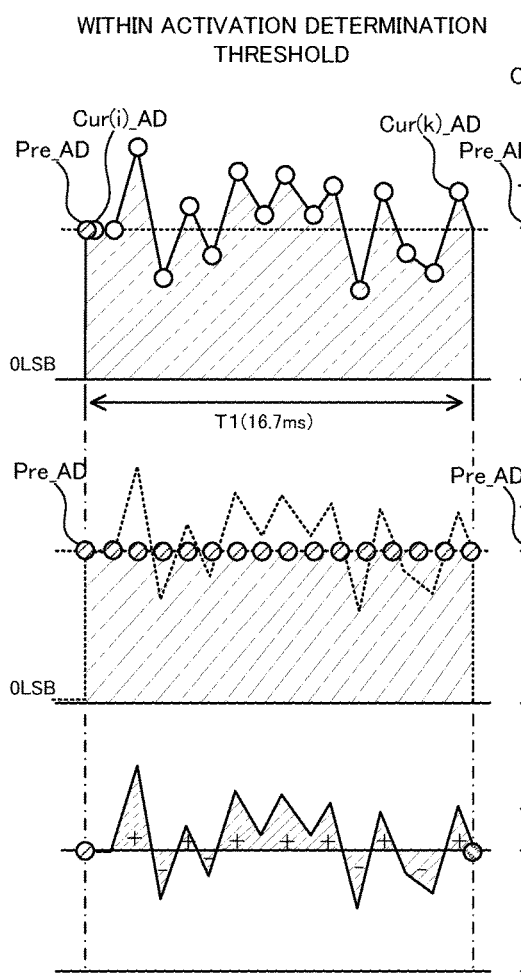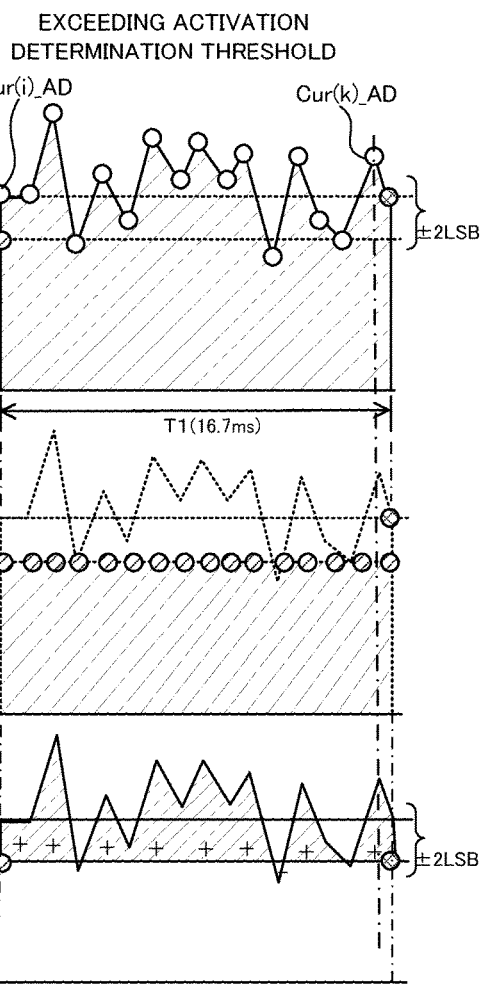

IMAGING APPARATUS AND POSITION DETECTION METHOD

CROSS-REFERENCE TO RELATED APPLICATIONS

Benefit is claimed, under 35 U.S.C. § 119, to the filing date of prior Japanese Patent Application No. 2016-224702 filed on Nov. 18, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and a position detection method that convert an electrical analog change, such as voltage change, to a digital value using an A/D converter, and detect position based on this AD value.

2. Description of the Related Art

As a position detection device that detects position using electrical analog change, there is known a position detection device that detects rotation operation position of an operation ring of a lens barrel, for example. Specifically, since a voltage that is detected using an encoder is varied in accordance with a rotation operation of an operation ring, it is possible to detect, for example, focal length or setting distance by subjecting this voltage to A/D conversion. At the time of detection, in order to prevent the effects of electrical noise, at the time of activation determination and stop determination, determination is performed with hysteresis threshold values (refer, for example, to Japanese patent laid open number 2001-267903 (hereafter referred to as "patent document 1")).

The width between threshold values for activation determination and stop determination constitutes detectable positional accuracy (resolution). This means that if an enlarged image is displayed when changing setting distance, coarseness of image movement is noticeable. So, when zooming (changing focal length), tracking precision for focus tracking is degraded. Since the threshold value is determined in accordance with electrical noise levels, to improve positional accuracy the only option is to reduce electrical noise, which has limitations.

SUMMARY OF THE INVENTION

The present invention provides an imaging apparatus and position detection method that can improve positional accuracy with a simple method.

An imaging apparatus of a first aspect of the present invention has a lens, that is capable of movement in an optical axis direction, provided inside a lens barrel that includes a photographing lens, the imaging apparatus comprising: an operation member, a detection element that outputs analog signals in accordance with position of the operation member, an A/D converter that carries out A/D conversion to convert the analog signals to digital values, and a controller that causes execution of A/D conversion by the A/D converter at given time intervals, detects position of the operation member based on the digital values, and controls position of the lens based on the position, wherein the controller, when it is determined that the operation member is stopped, compares an average value of a first number of digital values with a first threshold value, and determines that the operation member is moving if it has been determined that the average value is greater than the first threshold value, and when it is determined that the operation member is moving, compares a difference between a newest digital value and a digital value that was acquired a second number previously with a second threshold value, and determines that the operation member has stopped if it is determined that the difference is smaller than the second threshold value.

A position detection method of a second aspect of the present invention is for a position detection device having detection elements that output analog signals in accordance with position of a movable member, and an A/D converter that carries out A/D conversion to convert the analog signals to digital values, that causes execution of A/D conversion by the A/D converter at given time intervals, and detects position of the member based on the digital values, the position detection method comprising: when it is determined that the member is stopped, comparing an average value of a first number of digital values with a first threshold value, and determining that the member is moving if it has been determined that the average value is greater than the first threshold value, and when it is determined that the member is moving, comparing a difference between a newest digital value and a digital value that was acquired a second number previously with a second threshold value, and determining that the member has stopped if it is determined that the difference is smaller than the second threshold value.

A storage medium of a third aspect of the present invention is a computer readable storage medium storing a program that causes execution of a position detection method by a computer that is provided in a position detection device having detection elements that output analog signals in accordance with position of a movable member, and an A/D converter that carries out A/D conversion to convert the analog signals to digital values, the position detection method comprising: when it is determined that the member is stopped, comparing an average value of a first number of digital values with a first threshold value, and determining that the member is moving if it has been determined that the average value is greater than the first threshold value, and when it is determined that the member is moving, comparing a difference between a newest digital value and a digital value that was acquired a second number previously with a second threshold value, and determining that the member has stopped if it is determined that the difference is smaller than the second threshold value.

BRIEF DESCRIPTION OF THE DRAWINGS

FIG. 6A and FIG. 6B are graphs for describing activation determination, with the camera of one embodiment of the present invention.

DETAILED DESCRIPTION OF THE PREFERRED EMBODIMENTS

In the following, preferred embodiments of the present invention will be described in detail in accordance with the attached drawings. It should be noted that in the following description, an example is given of a digital camera as the imaging apparatus, and description is given for a case where an interchangeable lens is used with this camera. However, the present invention is not limited to this and may be applied widely as long as it is with a device that detects position in accordance with rotation operation or linear operation etc. It should be also noted that the imaging apparatus of this embodiment has a lens that is movable in an optical axis direction, provided within a lens barrel that includes a photographing lens.

Figure 1:
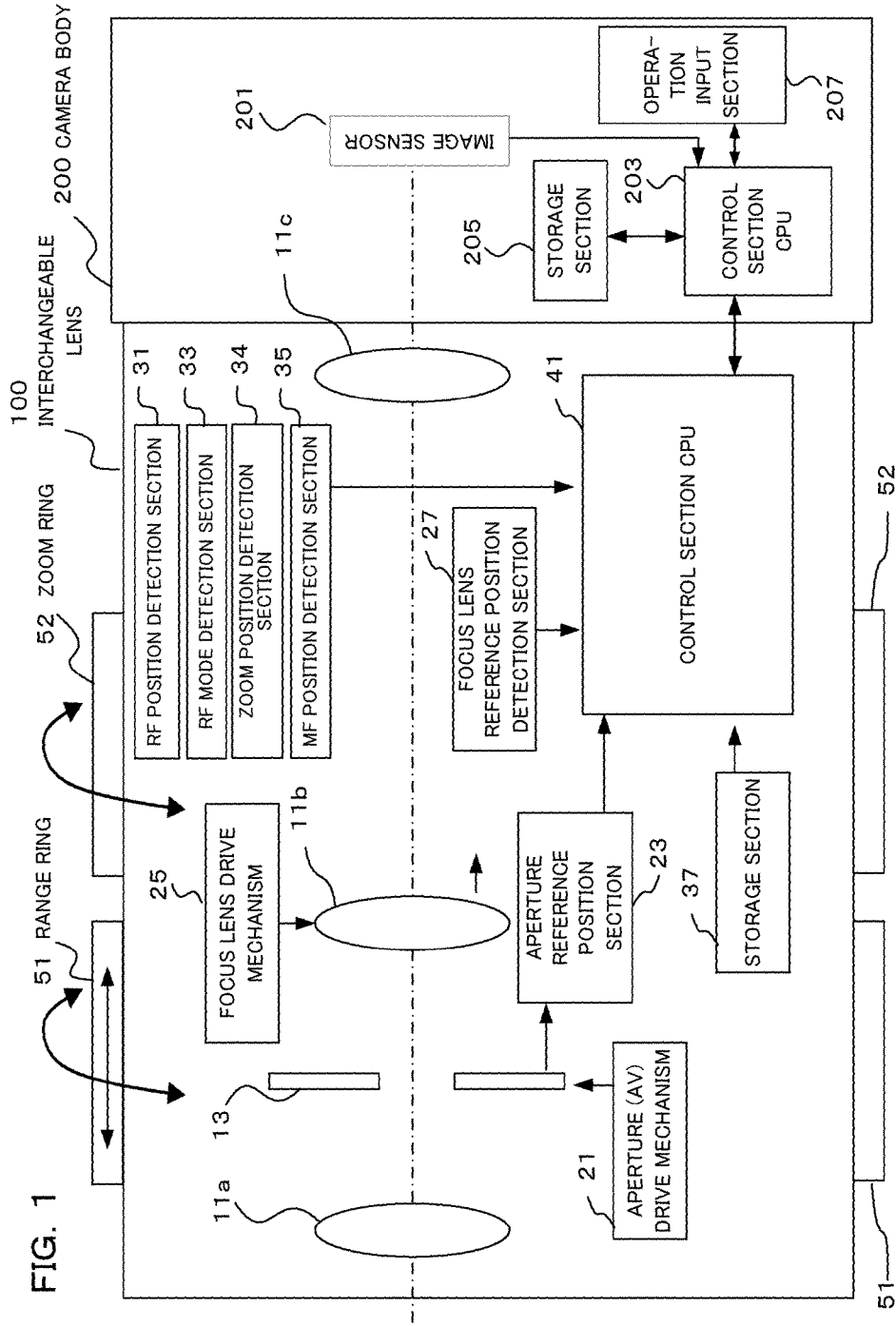
FIG. 1 is a block diagram showing the structure of a camera of one embodiment of the present invention.
Figure 2:
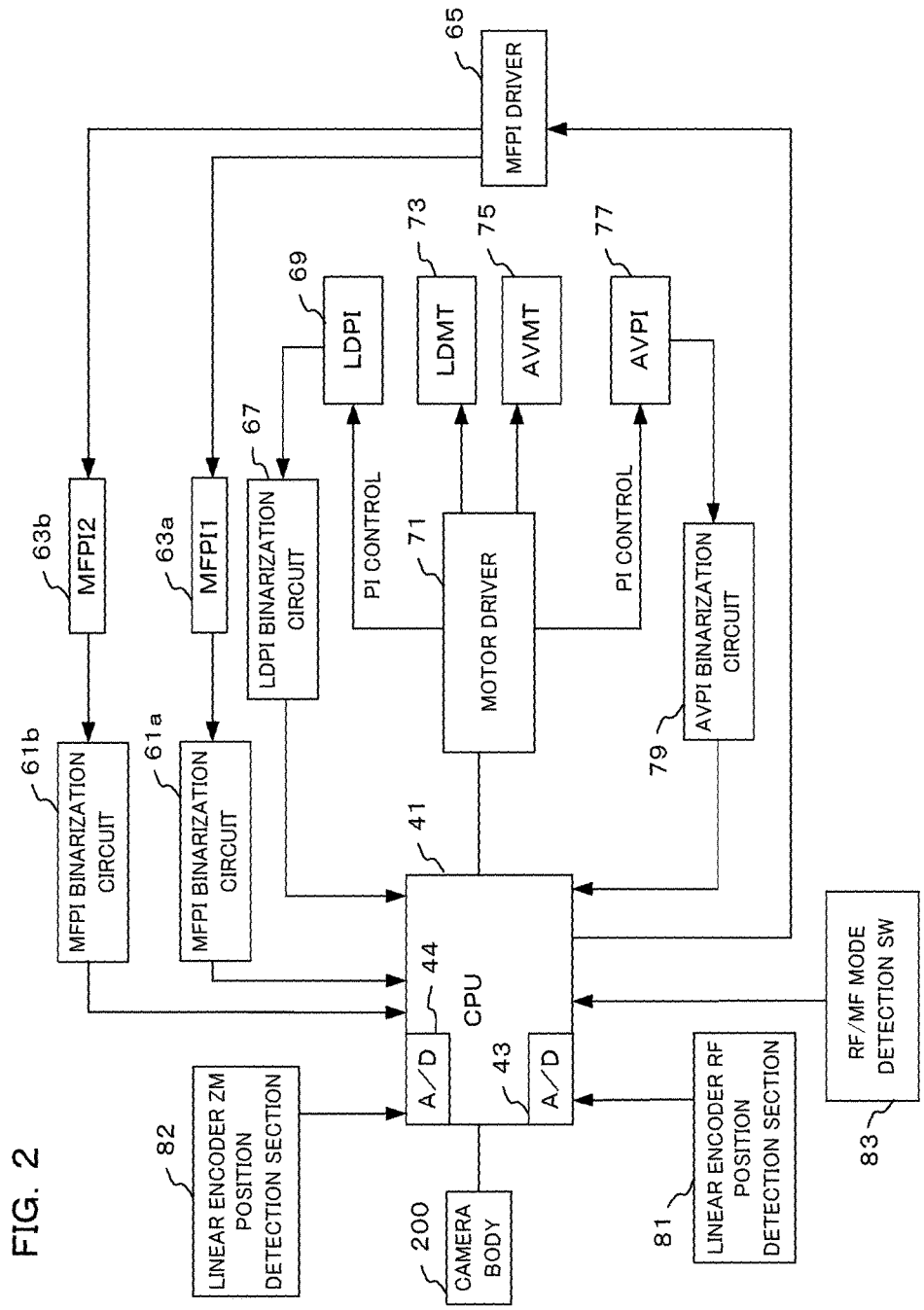
FIG. 2 is a block diagram mainly showing the electrical structure of a camera of one embodiment of the present invention.

FIG. 1 is a block diagram showing the structure of a camera of one embodiment of the present invention, and FIG. 2 is a block diagram showing the electrical structure of this camera. This camera comprises an interchangeable lens 100 and a camera body 200. It is also possible, however, for the lens barrel and the camera body to be integrally formed.

A photographing lens 11 made up of lenses 11a to 11c is provided within the interchangeable lens 100. A subject image is formed by the photographing lens 11. Within this lens 11, a focus lens 11b is a lens for focus adjustment, and is capable of being moved in the optical axis direction by a focus lens drive mechanism 25. The focus lens drive mechanism 25 has a focus lens actuator and a focus lens drive circuit. Also, some of the lenses 11a-11c are zoom lenses for varying focal length. Zoom lens groups are therefore provided inside the interchangeable lens 100.

Also, a focus lens reference position detection section 27 outputs a detection signal to a CPU (central Processing Unit) 41, which is a control section, if the focus lens 11b reaches a reference position. The focus lens position detection section 27 has a sensor for focus lens reference position detection, and a signal processing circuit that processes a signal from this sensor and outputs a detection signal. As a sensor for reference position detection, in this embodiment a photo interrupter (PI) is used, but detection may also be performed using a sensor other than a photo interrupter. It should be noted that with this embodiment, once the reference position has been detected, position detection of the focus lens 11b is carried out based on number of pulses (Pls number) applied to an actuator (using a stepping motor) for the focus lens, with that position as a reference.

An aperture 13 is arranged between the lens 11a and the lens 11b. The aperture 13 has an opening diameter varied by an aperture drive mechanism 21, to vary an amount of subject light that passes through the photographing lens 11. The aperture drive mechanism 21 has an aperture actuator and an aperture drive circuit etc. A stepping motor is used as the actuator, and fine control is carried out using micro step drive. It should be noted that the aperture 13 may also be arranged at a position other than between the lens 11a and the lens 11b.

An aperture reference position detection section 23 outputs a detection signal to the CPU 41 if the aperture opening diameter reaches a reference position. The aperture reference position detection section 23 has a sensor for aperture reference position detection, and a signal processing circuit that processes a signal from this sensor and outputs a detection signal. A reference position for aperture position is acquired by the reference position detection section 23, and aperture position is controlled by relative position detection. Relative position detection involves detection using a number of pulses applied to a stepping motor, while reference position detection in this embodiment involves detection using a photo interrupter (PI).

A range ring 51 is arranged around the periphery of the interchangeable lens 100. The range ring 51 is capable of being turned around the outside of the interchangeable lens 100, and also slides within a specified range of the optical axis direction of the photographing lens 11. If this range ring 51 is slid towards the subject side it is set to a non-RF (non-range focus) (sometimes also referred to as MF (manual focus)) position, and is set to an RF (range focus) position if it is slid towards the body side. Switching between RF mode and non-RF mode (MF mode) is carried out by sliding the range ring 51. Detection of this mode is carried out by an RF mode detection section 33. Also, the range ring 51 is constructed to be capable of being turned between a close-up end and an infinity end.

Non-RF mode is a mode for carrying out focusing in accordance with rotation direction and rotation amount of the range ring 51 by the user, while RF mode is a mode for focusing to a distance that has been designated using the range ring 51. Specifically, non-RF mode and RF mode are both manual focus, but with non-RF mode designation of a relative distance is carried out by the range ring 51, and differs from RF mode where an absolute distance is designated.

If MF mode is set by sliding the range ring 51, light shielding blades at an inner side of the range ring 51 rotate together with the range ring 51 as a result of rotation of the range ring 51. This rotation of the light shielding blades is counted by the photo interrupter (PI), and the focus lens 11b is driven in accordance with this count value. It should be noted that rotation direction and rotation amount of the range ring 51 may also be detected by a sensor other than a photo interrupter.

If RF mode has been set by sliding the range ring 51, then if the range ring 51 is rotated, that rotation position is detected by the RF position detector 31. The RF position detector 31 has an encoder, and detects absolute position for rotation position of the range ring 51. The focus lens drive mechanism 25 drives the focus lens 11b to an imaging distance corresponding to the rotation position of the range ring 51, in accordance with control signals from the CPU 41. This lens drive is carried out using a focus lens drive motor (LDMT 73), which will be described later. The range ring 51, when set to RF mode, functions as an operation member in this embodiment. This operation member is provided on the lens barrel.

The RF mode detection section 33 detects which of the non-RF position (MF position) or the RF position the range ring 51 has been set to, based on output of an RF/MF mode detection switch 83 (refer to FIG. 2).

An MF position detection section 35 includes a detection circuit that detects rotation amount and rotation direction of a ring member, and detects rotation direction and rotation amount of the range ring 51, when the range ring 51 has been set to the non-RF position (MF position). Manual focus is carried out based on the detection result of this MF position detection section 35. The MF position detection section 35 is made up of MFPIs 63a and 63b, and MFPI binarization circuits 61a and 61b etc., which will be described later.

The MF position detection section 35 functions as a rotation detector for detecting rotation amount and rotation direction of the ring member. This rotation detector detects rotation amount and rotation direction of the ring member every period. Also, pulse signals output in accordance with rotation of the range ring 51 that has been detected by the MF position detection section 35 are counted over a given time, to detect rotation velocity. It should be noted that description has been given for an example where a photo interrupter has been used as the detection section for rotation amount and rotation direction of the ring member. However, this is not limiting, and it is also used possible to use another sensor such as a photo reflector or a magnetic sensor.

A zoom ring 52 is arranged around the outside of the interchangeable lens 100, more to the body side than the range ring 51, and is capable of being turned around the outside of the interchangeable lens 100. The photographing lens is a zoom lens having variable focal length, and it is possible to carry out zooming if the user manually rotates the zoom ring 52. While a zooming operation may be carried out electrically, in this embodiment a zoom lens is driven with a manual operation, by means of a direct mechanical mechanism. The zoom ring 52 functions as an operation member in this embodiment. This operation member is provided on the lens barrel.

A zoom position detection section 34 includes a position detection sensor that detects an absolute value for rotation position of the zoom ring 52, and outputs to the CPU 41. As will be described later, the zoom position detection section 34 has a linear encoder ZM position detection section 82, output of this linear encoder position detection section 82 is subjected to AD conversion by an A/D converter 44 within the CPU 41, and this AD conversion value represents focal length.

A memory 37 has a rewritable nonvolatile memory, such as flash memory 37 etc., and stores programs for the CPU 41, various information such as optical data of the interchangeable lens, various adjustment values, and various parameters etc.

The CPU 41, being a control section, is a controller that carries out control within the interchangeable lens 100 in accordance with control instructions from the camera body 200, in accordance with a program stored in the previously described memory 37. The CPU 41 is input with detection signals from the aperture reference position detection section 23, focus lens reference position detection section 27, the RF position detection section 31, the RF mode detection section 33, and the MF position detection section 35, and outputs control signals to the focus lens drive mechanism 25 and the aperture drive mechanism 21. It should be noted that the control section has peripheral circuits besides the CPU 41, and may be configured so as to include circuits etc. within each section, such as the aperture reference position detection section 23, focus lens reference position detection section 27 etc.

An image sensor 201, CPU 203 within the control section, memory 205 and input unit 207 are arranged inside the camera body 200. This image sensor 201 is arranged close to an image forming position of the photographing lens 11, a subject image formed by the photographing lens 11 is subjected to photoelectric conversion, and image data is output. The CPU 203 also carries out communication with the CPU 41 within the interchangeable lens 100. The memory 205 has programs for overall control of the camera system, and the CPU 203 carries out overall control of the camera system. The input unit 207 comprises various operation members such as a release button, cross-shaped button etc.

Next, the detailed electrical structure will be described using FIG. 2. As described previously, the CPU 41 is capable of communication with the camera body 200. The CPU 41 is also connected to a motor driver 71, and this motor driver 71 carries out drive of an LDPI 69, LDMT 73, AVMT 75 and AVPI 77.

The LDPI 69 is a photo interrupter for reference position detection of the focus lens 11b, and output of this LDPI 69 is connected to an LDPI binarization circuit 67. The LDPI 69 and the LDPI binarization circuit 67 correspond to the previously described focus lens reference position detection section 27.

The LDMT 73 is a lens drive motor (LD motor), and functions as the previously described focus lens actuator within the focus lens drive mechanism 25. In this embodiment a stepping motor is adopted as the LD motor, but it is also possible to use another motor such as a common VCM (voice coil motor), for example. In the event that an ECM motor or the like is adopted, a sensor for absolute position detection of the focus lens may be provided. The AVMT 75 is an aperture motor, and functions as the previously described aperture actuator within the aperture drive mechanism 21.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detection section 23.

An MFPI driver 65 is a driver for a first MFPI 63a and a second MFPI 63b for detecting turning of the range ring 51 in a case where the range ring 51 has been slid to the MF position. The first and second MFPIs 63a and 63b have respective optical sensors and light emitting units, and light shielding blades are configured to be able to pass through between the optical sensors and light emitting units. An MFPI driver 65 turns on or turns off the light emitting units of the first and second MFPIs 63a and 63b in accordance with instructions from the CPU 41.

The first MFPI (termed "MFPI1" in the drawing) 63a and the second MFPI (termed "MFPI2" in the drawing) 63b are respectively provided at positions slightly apart in the turning direction of the light shielding blades. The installation locations of the first MFPI 63a and the second MFPI 63b are in a positional relationship such that a phase difference between signals from two MFPIs 63a and 63b is 90 degrees. If a rotation operation of the range ring 51 has been performed by the user, the light shielding blades move in unison, and as a result of this movement of the light shielding blades the MFPIs 63 are put in a light shielding state and a light passing state, and pulse signals are output from the first and second MFPIs 63a and 63b that are 90 degrees apart.

Output of the first MFPI 63a is connected to a first MFPI binarization circuit 61a, and binarized by the first MFPI binarization circuit 61a. Similarly, output of the second MFPI 63b is connected to a second MFPI binarization circuit 61b, and binarized by the second MFPI binarization circuit 61b. Rising and falling portions of the binarized pulse signals are called edges. The first and second MFPI binarization circuits 61a and 61b, first and second MFPIs 63a and 63b, and MFPI driver 65 correspond to the previously described MF position detection section 35.

Pulse signals from the MFPI 63 that have been binarized are output to the CPU 41, pulses (edges) corresponding to rotation velocity of the range ring 51 are counted by a two phase counter within the CPU 41, and rotation direction is also detected.

A linear encoder RF position detection section 81 is a linear encoder for detecting absolute value (rotation angle) in the rotation direction of the range ring 51, in a case where the range ring 51 has been slid to the RF position. The linear encoder RF position detection section 81 is provided so that a detection contact moves in accordance with turning of the range ring 51, and outputs an analog signal in accordance with absolute position of the range ring 51 in the turning direction.

The linear encoder ZM position detection section 82 is an encoder for detecting absolute value (rotation angle) for the zoom ring 52 in the rotation direction. The linear encoder ZM position detection section 82 is provided along the rotation direction of the zoom ring 52, and outputs an analog signal in accordance with an absolute position of the zoom ring 52 in the rotation direction. Details of a linear encoder used by the linear encoder RF position detection section 81 and the linear encoder ZM position detection section 82 will be described later using FIG. 3A and FIG. 3B.

An RF/MF mode detection switch (SW) 83 is a switch for detecting whether the range ring 51 has been set to the RF mode or set to the MF mode. This RF/MF mode detection SW 83 detects position of the range ring 51 in the optical axis direction, and is turned on or off when RF mode is set or when MF mode is set, and this on-off state is output to the CPU 41.

An A/D converter 43 is provided within the CPU 41, and converts analog signals from the linear encoder RF position detection section 81 to digital signals. A/D conversion values from the A/D converter 43 represent photographing distance (absolute distance) that has been designated by the user. The linear encoder RF position detection section 81 and the A/D converter 43 correspond to the previously described RF position detection section 31.

An A/D converter 44 is also provided within the CPU 41, and converts analog signals from the linear encoder ZM position detection section 82 to digital signals. A/D conversion values (called "ZMENC") from the A/D converter 44 represent focal length that has been set by the user.

The A/D converters 43 and 44 within the CPU 41 function in this embodiment as A/D converters for carrying out A/D conversion for converting analog signals to digital values. Also, in this embodiment, the CPU 41 functions as a controller that causes execution of A/D conversion by the A/D converters at given time intervals, and detects positions of members based on digital values (refer, for example, to FIG. 10). When it is determined that the operation member is stopped, this controller compares an average value of a first number of digital values with a first threshold value and determines that the member is moving if it is determined that the average value is larger than the first threshold value (refer, for example, to S59 and S63 in FIG. 15), and when it is determined that the member is moving compares a difference between a newest digital value and a digital value acquired a second number of values prior with a second threshold value, and determines that the member has stopped if the difference is smaller than the second threshold value (refer, for example, to FIG. 16).

Figure 14:
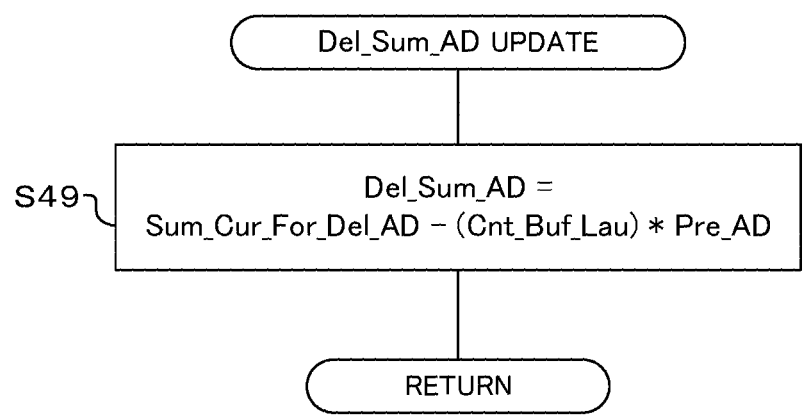
FIG. 14 is a flowchart showing operation for Del_Sum_AD update, in the camera of one embodiment of the present invention.
Figure 15:
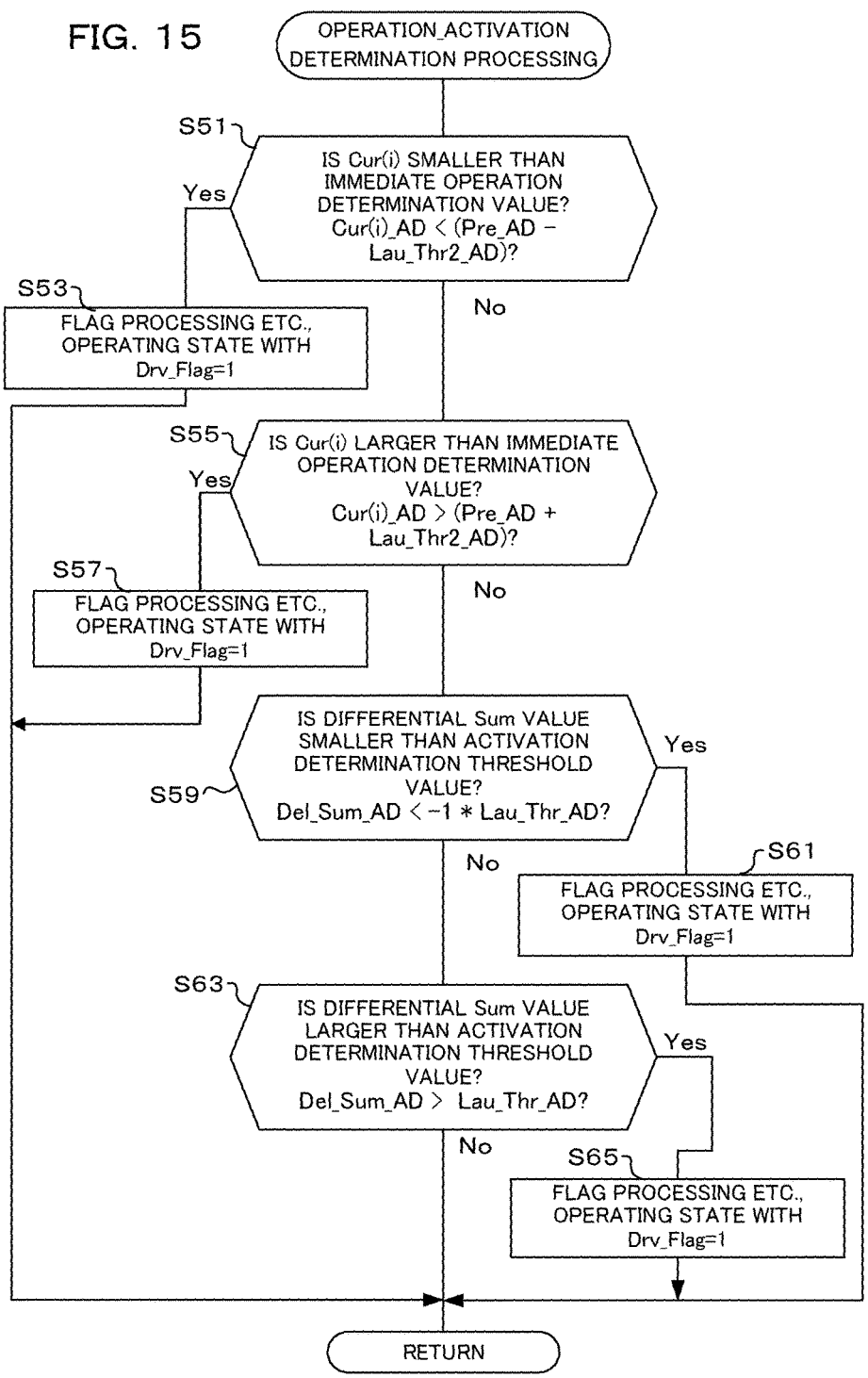
FIG. 15 is a flowchart showing operation for operation_activation determination processing, in the camera of one embodiment of the present invention.

Also, when it is determined that the member is stopped, the above described controller compares a newest digital value with a third threshold value that is larger than the first threshold value, and determines that the member is moving if the newest digital value is larger than the third threshold value (refer, for example to S51 and S55 in FIG. 15). When it is determined that the operation member is moving, the above described controller updates an average value of a third number of digital values, the third number being smaller than the first number, as position of the member (refer, for example, to S81 in FIG. 17). After having determined that the member has stopped, the above-described controller makes an average value of a fourth number of digital values a stopped position (refer, for example, to S83 in FIG. 18). The above described controller determines the first threshold value based on the stopped position (refer, for example, to S59 and S63 in FIG. 15, and S49 in FIG. 14). The above described controller determines the third threshold value based on the stopped position (refer, for example, to S51 and S55 in FIG. 15).

Also, the CPU 41 functions as a controller for controlling position of the lens based on position of the operation member. This lens is a focus adjustment lens (in this embodiment, the previously described focus lens 11b functions as a focus adjustment lens). The lens is also a zoom lens (in this embodiment a zoom lens within the photographing lens 11).

Figure 3A:
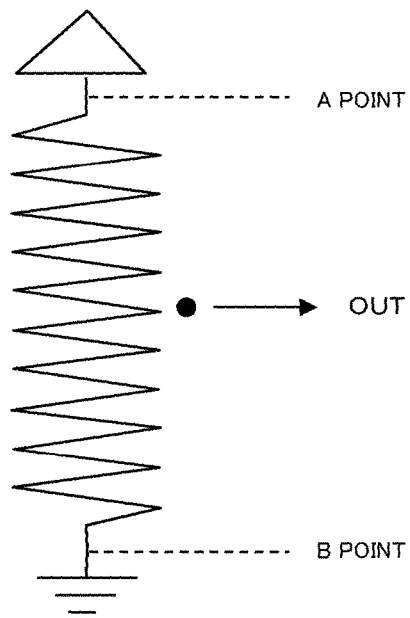
FIG. 3A and FIG. 3B are for a linear encoder of the camera of one embodiment of the present invention, with FIG. 3A being a drawing showing the electrical structure of the linear encoder, and FIG. 3B being a graph showing an output characteristic of the linear encoder.

Next, a linear encoder used by the linear encoder RF position detection section 81 and the linear encoder ZM position detector 82 will be described using FIG. 3A and FIG. 3B. The linear encoder is a resistive slider type electrical component, as shown in FIG. 3A, with point A being connected to a power supply Vcc, point B being connected to ground (GND), and an output point OUT being mechanically slid in accordance with position of the zoom ring 52, or of the range ring 51 when set to RF mode.

Figure 3B:
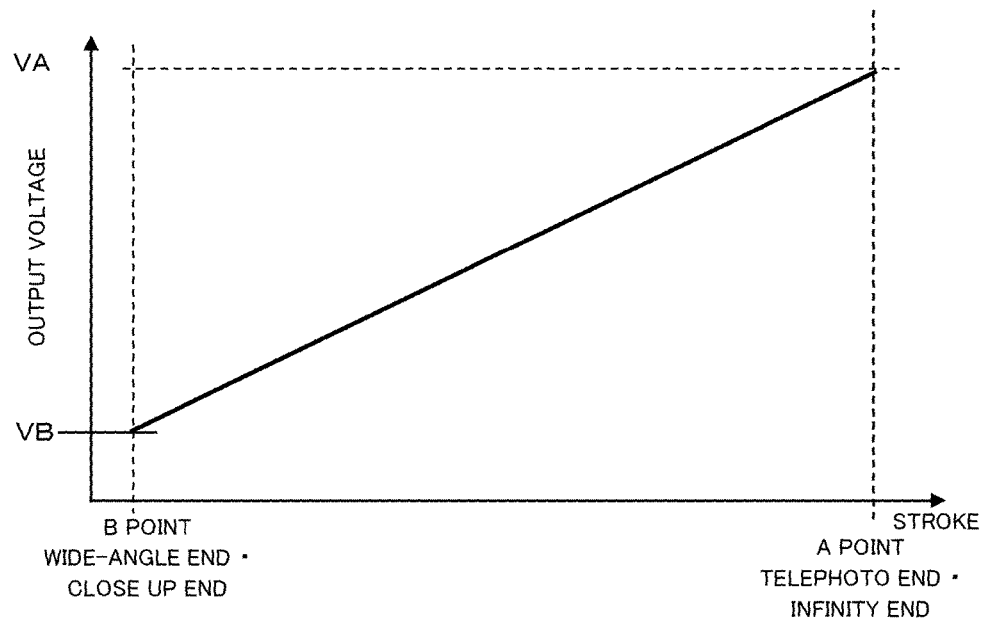

If the position of the output point OUT of the linear encoder is varied, a resistively divided output voltage varies as shown in FIG. 3B. Output voltage of the linear encoder is converted to digital data by the A/D converters 43 and 44, and output to the CPU 41. With this embodiment, a slider type resistor inside the linear encoder RF position detection section 81 or the linear encoder ZM position detection section 82 functions as a detection element that outputs an analog signal in accordance with position of a movable member.

Next, position control of this embodiment will be described. In this embodiment the following controls (1) to (5) are carried out.

(1) Commencement of user operation will be called "activation", and processing to detect commencement of user operation will be called "activation determination processing". At the time of activation determination processing, in order to avoid erroneous activation detection, noise is suppressed by acquiring and smoothing data with a number of samples that can be set within a time that is acceptable as operation delay (refer to FIG. 6A and FIG. 6B). In this way, it is possible to set and validate an activation determination threshold value that is smaller than electrical noise, and detection accuracy for commencement of user operation is improved. Regarding the time that is acceptable as operation delay, if, for example, it is less than a refresh rate for display on a camera rear monitor (for example, 60 Hz=17.7 ms), it will not be recognized as delay, and 16.7 ms can be considered to be an acceptable time.

(2) In a case where a change amount of A/D conversion value (AD value) is obviously larger than the noise, it is determined that the user has carried out a large operation (referred to S51 and S55 in FIG. 15). In order to make this determination, an instant activation determination threshold that is larger than activation determination threshold is provided, it is determined that activation has been performed if a change value of the AD value is larger than the instant activation determination threshold, and it is possible to improve activation response by omitting the activation determination processing using the previously described start up determination threshold.

Figure 4:
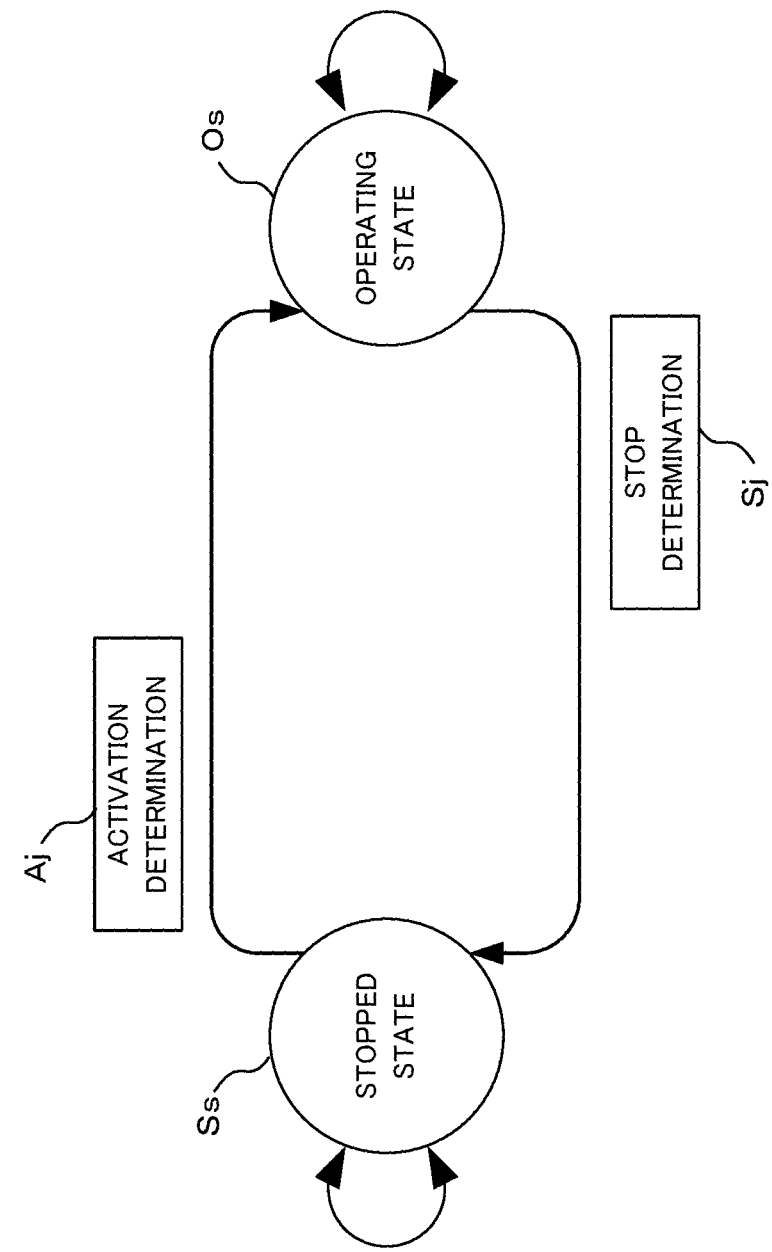
FIG. 4 is a control schematic diagram showing a stopped state and an operating state, in the camera of one embodiment of the present invention

(3) Two states, namely a stopped state and an operating state, are provided (referred to FIG. 4 regarding the two states). If activation has been determined, there is a state transition from the stopped state to the operating state. In the operating state, in order to carry out position detection with good followability position detection is carried out with a reduced number of samples than for activation (refer to FIG. 7).

(4) If there is a transition to the operating state, during operation a reference position (Pre_AD value) is constantly updated, a change amount between current AD value and a previous AD value (gradient) is calculated, and stop determination processing is carried out with operation change amount (refer to FIG. 8 and FIG. 16, which will described later). With a conventional position detection device, stop determination is performed by comparing an AD value with a threshold value for stop determination, which means that if an AD value including noise (position information) is less than the threshold value for stop determination, stop was determined. However, with this embodiment, stop determination is carried out using operation change amount. This means that it is possible to improve the precision of determining that user operation has stopped.

(5) If stop has been determined, there is a state transition from the operating state to the stopped state. Regarding current position after stop determination, average position data of position data that has been sampled a plurality of times, during stop determination or after the stop determination, is stored as an actual position. In this way a noise component is canceled, and a mechanical (physical) stopped position is made to highly precisely coincide with the stopped position that has been electrically detected. It is possible to improve detection accuracy of the stopped position (refer to FIG. 8 and FIG. 9).

Next, control of state transition between the stopped state and the operating state will be described using FIG. 4. Here description will be given using an example of a case for a zoom ring 52 operation. While the user is carrying out the zoom operation will be termed the "operating state" Os, and while the zoom operation is not being carried out will be termed the "stopped state" Ss. Activation determination Aj is the previously described activation determination processing, and in the stopped state Ss is determination as to whether or not the user has commenced zoom operation. Stop determination Sj is the previously described stop determination processing, and in the operating state Os is determination as to whether or not the user has completed a zoom operation. Details of the activation determination Aj will be described later using FIG. 6A, FIG. 6B and FIG. 15, and details of the stop determination Sj will be described later using FIG. 8 and FIG. 16.

Figure 5:
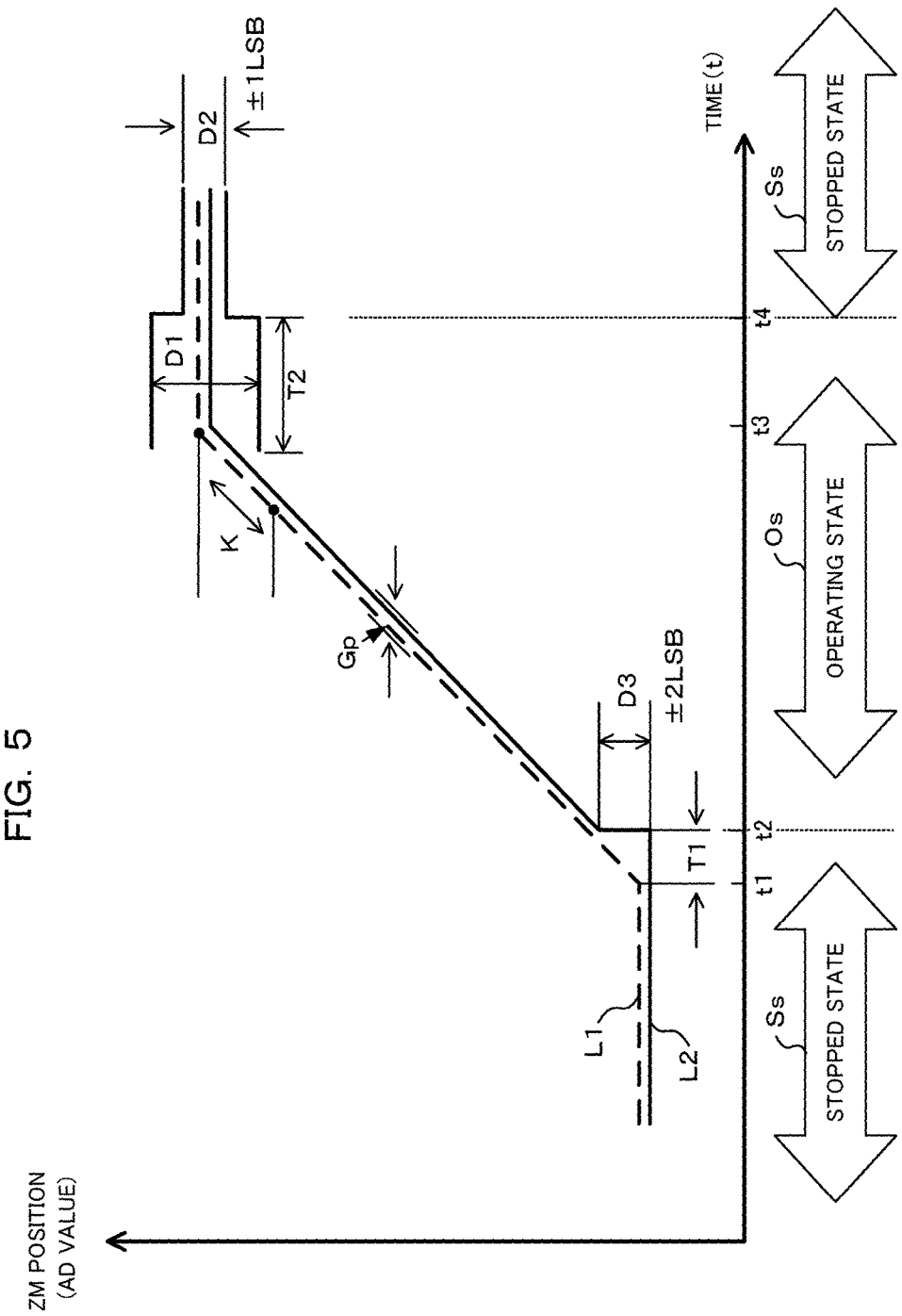
FIG. 5 is a graph for describing calculation of AD values, with the camera of one embodiment of the present invention.

Next, confirmation of AD value will be described using FIG. 5. FIG. 5 shows time on the horizontal axis, and shows zoom (ZM) position (AD value) on the vertical axis. If the user operates the zoom ring 52, focal length changes in accordance with the zoom operation. The line L1 shown as a dotted line in FIG. 5 shows zoom position corresponding to zoom operation amount. Also, line L2 shown as a solid line shows confirmed value for AD value after output from the linear encoder ZM position detection section 82 has been converted by the A/D converter 44. In the following, a confirmed value for AD value will be called confirmed AD value, and AD value resulting from A/D conversion one time will simply be called AD value.

Initially, the user is not carrying out a zoom operation and the system is in the stopped state, but at time t1 a zoom operation is commenced. In the stopped state, activation determination Aj is carried out, and the activation determination is carried out within a delay time T1 which is acceptable as operation delay (with this embodiment, delay time is 16.7 ms). Also, a level difference of D3 arises in the confirmed AD value due to this delay time (with this embodiment, the intention is to make D3=±2LSB, for example). The activation determination Aj is determination as to whether or not operation has commenced, based on average lag of a plurality of samples within a given time. It should be noted that LSB means the lower order bit (least significant bit) of a digital value. Details of the activation determination will be described later using FIG. 6A and FIG. 6B.

In FIG. 5, when activation has been determined, from time t2, which is after the delay time from time t1 when user operation commences, there is a transfer to the operating state Os where the confirmed AD value (L2) tracks user operation (L1). In the operating state Os the confirmed AD value can track AD value representing actual operation amount (AD value resulting from a single A/D conversion) offset by a position detection delay Gp. In the operating state Os it is next determined whether or not a rotation operation of the zoom ring 52 has stopped, that is, stop determination processing is carried out. Details of the stop determination processing during the operating state Os will be described later using FIG. 7.

Also, while operation is in progress, operation stop determination is carried out from change amount (gradient K) AD value resulting from sampling a plurality of times within a given time. At time t3, if it is determined that the operation of the zoom ring 52 has stopped, change of the AD value is stopped. At this time, a difference between AD value and mechanical zoom position is positioned within a range of error D1 included in AD value, but after delay time T2 (time until time t4 which is 16.7 ms after time t3) stopped position is calculated so that the AD value becomes within a range D2 of ±LSB from real stopped position, using processing for stopped state position update, which will be described later.

In a conventional position detection device, this is equivalent to electrical noise, and constitutes a threshold value at the time of activation determination. Conversely, with this embodiment, a delay time T1 that is acceptable as operation delay is used, and activation determination is carried out with an activation determination threshold value that is narrower than the electrical noise. While the user is performing operations, position detection is carried out by performing averaging processing that takes in to consideration acceptable response lag.

Also, with a conventional position detection device, position detection is also carried out at the time of stop determination by performing averaging processing of AD values, in order to reduce the effects of noise. While the effects of noise are reduced by averaging processing, it is still necessary to set electrical noise amount that remains as a threshold value, and real mechanical position and electrically detected position are offset by the threshold value at most. Conversely, with this embodiment, stop determination is carried out with a threshold value that is narrower than an electrical noise amount, and it is possible to keep real mechanical position and electrical detected position to a precision of less than a discretization error (error amount in FIG. 5 is less than D2).

Next, activation determination processing will be described using FIG. 6A and FIG. 6B. This activation determination processing is processing for determining whether or not the user has commenced an operation such as a rotation operation in a state where operation member such as the range ring 51 or the zoom ring 52 is stopped. At the time of the activation determination, determination uses a threshold value for activation determination (called Lau_Thr_AD in this embodiment), and FIG. 6A shows a case where it has been determined that there is not activation (a case of being within the activation threshold), while FIG. 6B shows a case where it has been determined that there is activation (a case of exceeding the determination threshold).

In the upper graphs of FIG. 6A and FIG. 6B the horizontal axis represents time, and the vertical axis represents AD value. Circles at the left side of the graph are confirmed AD value Pre_AD, and the confirmed AD value Pre_AD is a variable for storing moving average AD value (Cur(i)_AD) that has been updated. Also, white circles shown at given time intervals to the right side of the confirmed AD value Pre_AD are moving average AD values resulting from averaging AD values, that have been measured every respective time, within a given time, and are expressed as Cur(i)_AD (i=1 to k). An accumulated value Sum_Cur_For_Del_AD for moving average AD value within a permissible delay time T1 is a value resulting from adding the moving average AD values Cur(i)_AD for i=1 to k. K is a number of Cnt_Buf_Lau, and is derived by dividing the permissible delay time T1 by AD conversion interval. For example, k=16 in FIG. 6A and FIG. 6B. Accompanying update of moving average AD value Cur(i)_AD for every periodic processing, Sum_Cur_For_Del_AD is also updated. The area of the portion that has been filled with slanted lines in the graphs at the upper parts of FIG. 6A and FIG. 6B corresponds to the value of Sum_Cur_For_Del_AD.

The middle graphs in FIG. 6A and FIG. 6B show states where all confirmed AD values Pre_AD at the time of each A/D conversion have been plotted. In the event that the result of activation determination is No, namely when it has been determined that the user has not operated the operation member, confirmed AD value Pre_AD is maintained. The area of portions that have been filled with slanted lines is equivalent to (Cnt_Buf_Lau)*Pre_AD. It should be noted that * means multiply.

Portions that have been filled with slanted lines in the lower graphs of FIG. 6A and FIG. 6B correspond to values resulting from subtracting the portions that have been filled with slanted lines in the middle graphs from the portions that have been filled with slanted lines in the top graphs. Specifically, the portions Del_Sum_ADT that have been filled with slanted lines in the lower graphs correspond to values resulting from subtracting the portions that have been filled with slanted lines in the middle graphs (Cnt_Buf_Lau)*Pre_AD from the portions that have been filled with slanted lines in the upper graphs Sum_Cur_For_Del_AD.

Moving average AD value Cur(i) resulting from performing a moving average of AD values that have converted at the time of each AD conversion includes a noise component, and with only a single value is not possible discriminate between data change of a resolution it is desired to detect (for example, 2 LSB) and noise. Since noise is randomly generated, it is possible to suppress noise by increasing sample number and averaging. Compared to confirmed AD value Pre_AD that constitutes a reference position (refer to the middle graphs in FIG. 6A and FIG. 6B), sample number for moving average AD value Cur(i)_AD is increased (refer to the upper graphs in FIG. 6A and FIG. 6B), and the effect of obtaining an accumulated value Del_Sum_AD for absolute value of both differences is shown in the lower graphs of FIG. 6A and FIG. 6B. If noise is generated randomly, such as Del_Sum_AD shown in the lower graph in FIG. 6A, AD value that has become large and AD value that has become small due to noise cancel out with respect to confirmed Pre_AD constituting a reference, and its average value becomes approximately Pre_AD.

In a case where the user is not operating the operation member, if a sufficient number of samples are ensured in this way, Del_Sum_AD converges on 0 (refer to the lower graph in FIG. 6A). On the other hand, if the user is operating the operation member, an average value for Del_Sum_AD becomes a value that has changed from Pre_AD in accordance with operation amount (refer to the lower graph in FIG. 6B).

FIG. 6A shows a case where activation determination becomes No. In this case, Del_Sum_AD (slanted line section area) shown in the lowermost graph in FIG. 6A is determined to be within the threshold value Lau_Thr_AD (not shown) for activation determination, and is a case where it is determined that activation is not being performed. If the result of activation determination is No, namely if it is determined that activation is not being performed, then confirmed AD value Pre_AD is not updated during the next permissible delay time T1. In this case a flag Drv_Flag is set to 0, and the "stopped state" is maintained (refer to S59 No and S63 No in FIG. 15, which will be described later).

FIG. 6B shows a case where activation determination becomes Yes. This represents a case where it has been determined that Del_Sum_AD (slanted line area) shown in the lower graph of FIG. 6B is larger than the threshold value Lau_Thr_AD (not shown) for activation determination. If the result of activation determination is Yes, specifically if it has been determined that there is start up, then Cur(k)_AD is stored as confirmed AD value Pre_AD during the next permissible delay time T1. Cur(k)_AD is a newest Cur(i)_AD value for periodic processing data update. In periodic processing after activation determination has returned Yes, the flag Drv_Flg is set to 1 and there is an update to the "operating state". By updating the flag condition, for the next periodic processing periodic processing for the operating state is executed (refer to S59 Yes, S61, S63 Yes and S65 in FIG. 15, which will be described later).

Values that have been acquired by subjecting analog values that represent movement of the operation member to A/D conversion are discrete values. However, it is possible to obtain information on decimal levels less than 1 LSB by applying processing such as shown in FIG. 6A and FIG. 6B. For example, if Cnt_Buf_Lau (sample number within the permissible delay time T1) is 16, if this is converted to an activation determination threshold value Lau_Thr_AD then 1 LSB corresponds to 16 and similarly 2 LSB becomes 32. Then, if detection is desired with a detection accuracy of 2.5 LSB, Lau_Thr_AD should be set to 16*2.5=40. By making the sample number 40, it is possible to detect with an accuracy of 2.5 LSB.

Figure 7:
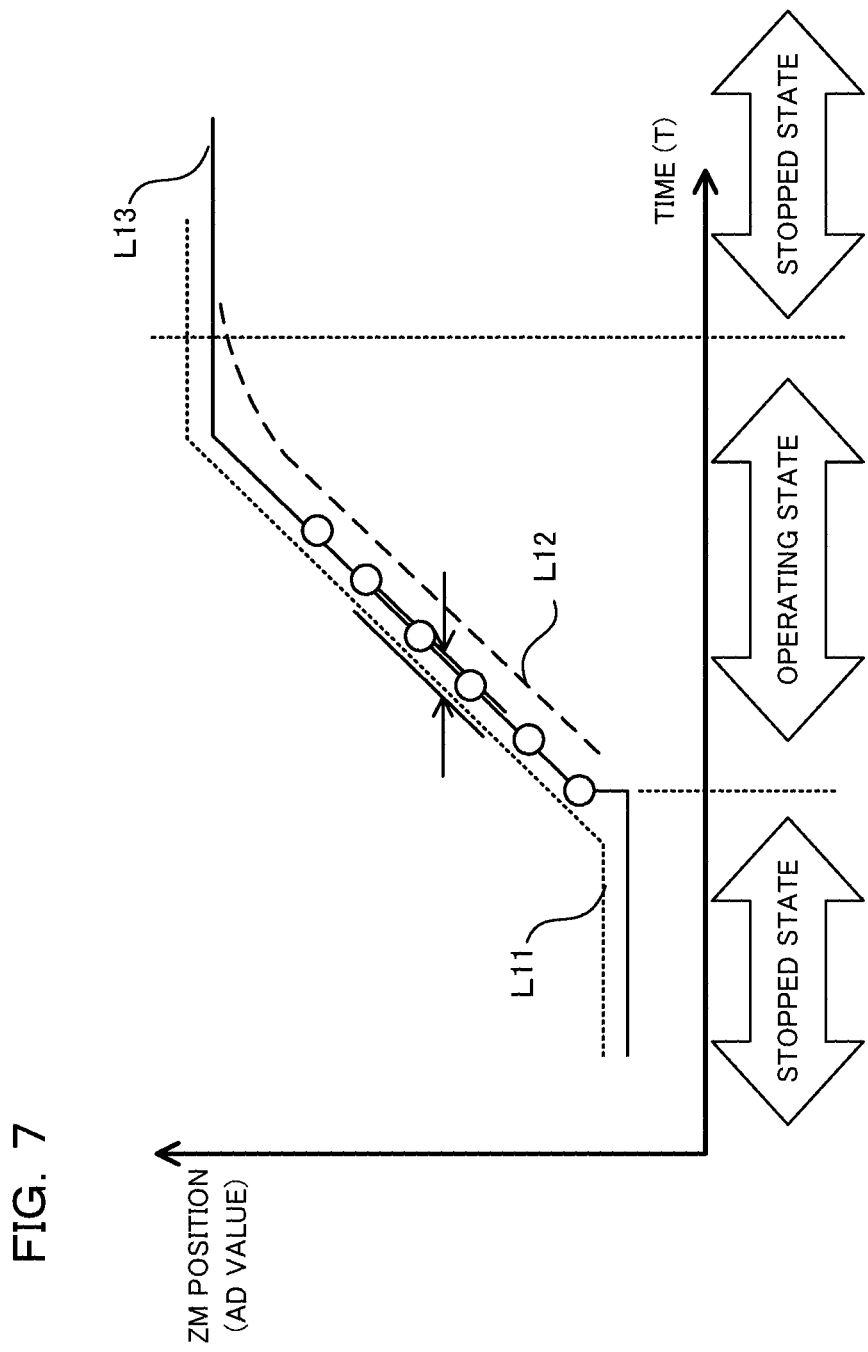
FIG. 7 is a graph for describing a single update during operation, with the camera of one embodiment of the present invention.

Next, position update during operation will be described using FIG. 7. FIG. 7 shows AD values during operation, and in FIG. 7 line L11 is an ideal position detection locus, line L12 shows locus of Del_Cur_AD, and line L13 is a locus connecting actual moving average AD values Cur(i)_AD. Here, Del_Cur_AD is a value resulting from subtracting "oldest Cur_AD value before Cnt_Buf_Stop" from "newest Cur_AD value", and is equivalent to Cur(Cnt_Buf_Stop)_AD-Cur(1)_AD.

If it is determined that there has been activation, then there is a transition from the "stopped state" to the "operating state" in the state transition diagram shown in FIG. 4. In the operating state confirmed AD value Pre_AD is updated with Cur(i)_AD that has been detected, for every periodic processing. For example, if a moving average count Cnt_Ave is 2, then for the operating state, since detection is carried out with moving average performed twice, responsiveness is improved from that for the moving average performed 16 times at the time of activation determination. It should be noted that moving average counts Cnt_Ave are respectively stored in the memory 37, for activation determination processing and for position update during operation.

Next, stop determination will be described using FIG. 8. The stop determination processing in permissible delay time T11 on the left side in FIG. 8 is a case where stop determination it becomes No, while the stop determination processing in permissible delay time T12 on the right side in FIG. 8 is a case where stop determination becomes Yes. Also, the white circles in FIG. 8 are moving average AD values Cur(i)_AD. It should be noted that in FIG. 8 the number of moving average AD values Cur(i)_AD within the permissible delay time T11 (periodic processing time) is shown as 16, but with this embodiment 64 Cur(i)_AD values are obtained, for example. Position update for the operating state involves updating the confirmed AD value Pre_AD with a moving average AD value Cur(i)_AD for every periodic processing, in order to give good responsiveness. In the operating state, for Cur(i)_AD a moving average count is set to 2, which is low, and so a noise component becomes large compared to performing moving average 16 times in the activation determination processing.

Figure 8:
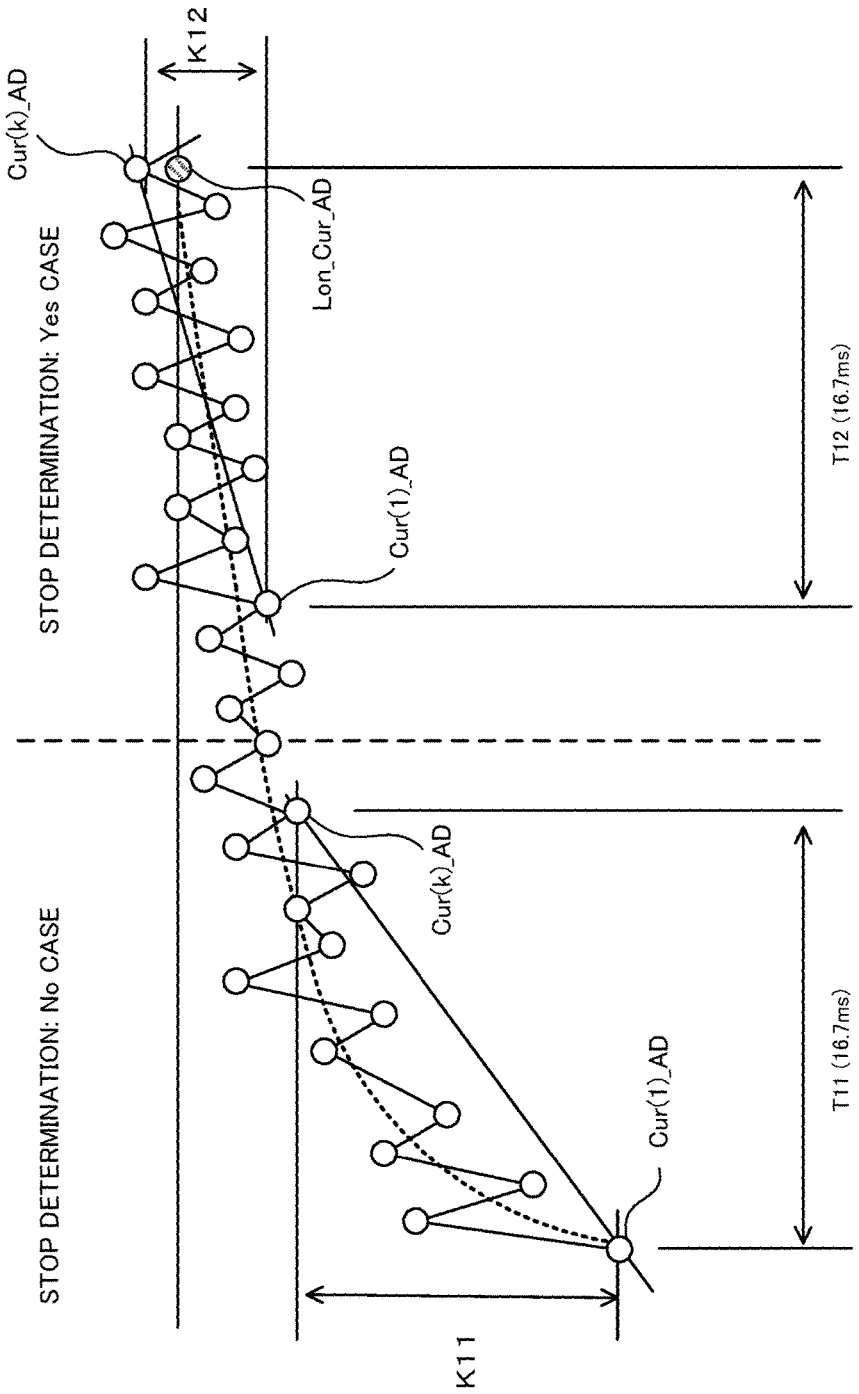
FIG. 8 is a graph for describing stop determination, with the camera of one embodiment of the present invention.

For stop determination, values that are equivalent to gradients K11 and K12 of change in moving average AD value Cur(i)_AD for the permissible delay time T11 and permissible delay time T12 in FIG. 8 are calculated. The values that are equivalent to the gradients K11 and K12 are previous Del_Cur_AD, and are obtained using Del_Cur_AD=Cur(k)_AD-Cur(1)_AD. It is determined whether or not Del_Cur_AD is less than the stop determination threshold value Stop_Thr_AD, and if it is less than the stop determination threshold value it is determined that operation has stopped. It is determined whether or not the newest moving average AD value and inclination K (change rate) for change in the previous k (number of samples within a period) moving average AD values converge to stop, or whether or not inclination K is close to 0. It should be noted that counting from the newest moving average AD value Cur(k)_AD a moving average AD value ahead of Cnt_Buf_Stop becomes Cur(1)_AD. That is, k represents the newest AD value, and 1 represents a previous AD value.

As was described previously, a moving average AD value Cur(i)_AD in the operating state has a small moving average count and so a noise component is large. A confirmed AD value Pre_AD at the time of stop determination becomes a reference AD value for the next periodic processing, but if a stopped position varies the reference AD value becomes an offset position and there is a possibility that there will be erroneous activation determination with the next periodic processing. Therefore, after stop determination, long moving average AD value s Lon_Cur_AD, for carrying out moving average processing with a larger moving average count, are calculated and stopped position is obtained with higher accuracy. By obtaining stopped position with higher accuracy it is possible to prevent erroneous activation determination for the next periodic processing, such as described previously.

The long moving average AD value s Lon_Cur_AD are calculated from the following equation using a predetermined moving average count Cnt_Buf_Lon_Cur and Sur_Cur_For_Lon_AD that is an accumulated value of AD value Cur(i)_AD, for the course of this moving average calculation. The meaning of the following equation will be described later.

$$Lon\_Cur\_AD=INT(Sur\_Cur\_For\_Lon\_AD/Cnt\_Buf\_Lon\_Cur+0.5)$$

Here INT means an integer value for the content within parenthesis.

As described previously, if Del_Cur_AD which is equivalent to the gradients K11 and K12 is determined to be less than the stop determination threshold value, stop determination is performed. In the event that stop determination has been made, confirmed AD value Pre_AD is updated with the moving average AD value Lon_Cur_AD at that time. Lon_Cur_AD is a moving average AD value for Cnt_Buf_Lon_Cur times, where Cnt_Buf_Lon_Cur means a number of samples of AD value at the time of stop determination, and is stored in advance in the memory 37.

The left side of FIG. 8 (corresponding to the period of the permissible delay time T11) is a case where the stop determination becomes No. This is a case where Del_Cur_AD exceeds the range of threshold value Stop_Thr_AD for stop determination. In the event that stop determination is not performed, the "operating state" is maintained, and confirmed AD value Pre_AD is updated with AD value Cur(i)_AD.

The right side of FIG. 8 (corresponding to the period of the permissible delay time T12) is a case where the stop determination becomes Yes. This is a case where Del_Cur_AD is less than threshold value Stop_Thr_AD for stop determination. In the event that stop determination is Yes, confirmed AD value Pre_AD is updated with long moving average AD value Lon_Cur_AD, and not moving average AD value Cur(i)_AD. In periodic processing after stop determination has returned Yes, the flag Drv_Flg is set to 0 and there is an update to the stopped state. By updating the flag status, the subsequent periodic processing executes processing for activation determination.

Figure 9:
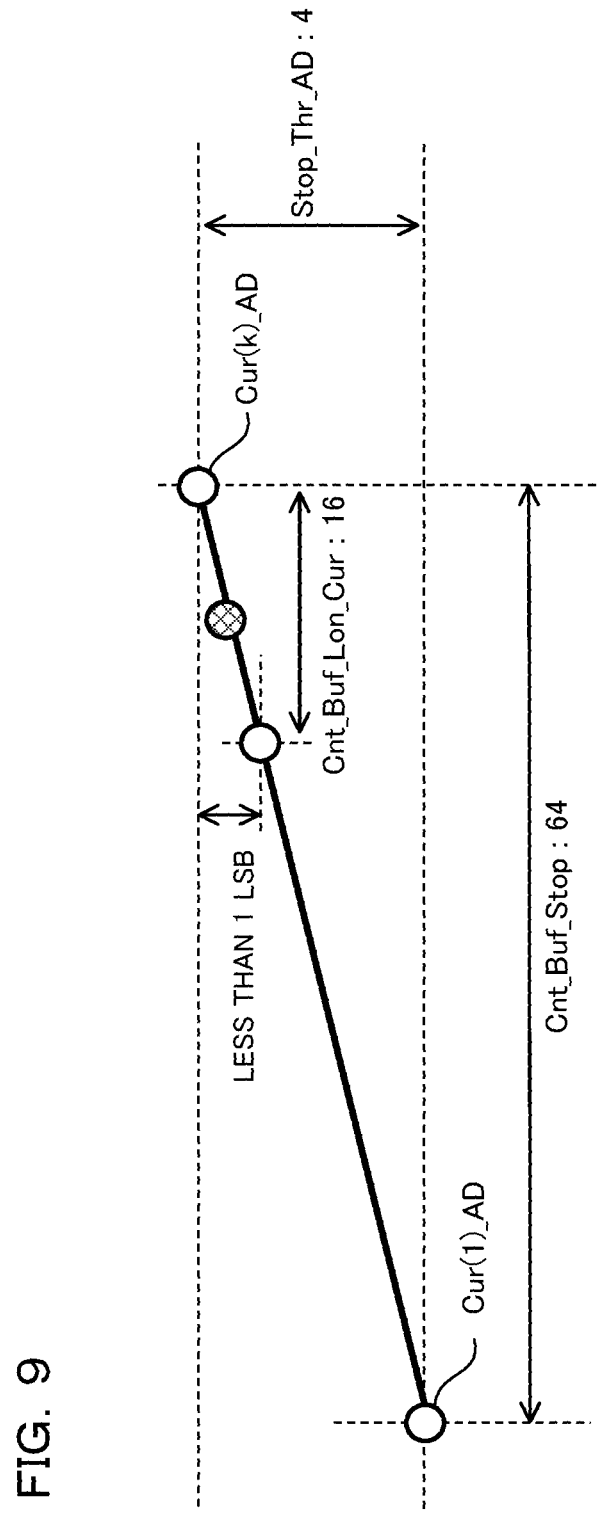
FIG. 9 is a drawing showing a relationship between mechanical stopped position and electrical stopped position, in the camera of one embodiment of the present invention.

Next, description will be given for processing (previously described equation) to obtain stopped position with higher accuracy, either after or in parallel with stop determination. For example, as shown in FIG. 9, stop determination processing and stopped position calculation are executed with threshold value Stop_Thr_AD for stop determination set to 4, sample number for stop determination Cnt_Buf_Stop set to 64, and sample number for moving average AD value calculation Cnt_Buf_Lon_Cur set to 16. Since stop determination is not theoretically possible if the threshold value Stop_Thr_AD is less than an electrical noise amount, it can not be set to value less than the electrical noise component. The threshold value for stop determination Stop_Thr_AD is set to 4 taking into consideration electrical noise component.

In the case shown in FIG. 9, in the stop determination processing, stopped is determined from a determination result of Cur(64)_AD-Cur(1)_AD)≤Thr_AD. Here, since the sample number for stop determination Cnt_Buf_Stop is 64, a difference between the first of the 64 items of data Cur(1)_AD and the last of the 64 items of data Cur(64)_AD becomes the size of 4 LSB. Hypothetically speaking if the AD value is changing linearly, then since change of the 64 items of data is 4 LSB, equivalence to 1 LSB becomes data change for 16 items of data.

Therefore, by calculating stopped position Lon_Cur_AD using the previously described equation based on the final 16 items of data from the 64 items of data, it is possible to obtain stopped position with precision of less than 1 LSB. Specifically, for stopped position, Cnt_Buf_Lon_Cur is 16, and since 4 LSB*16/64=1 LSB is averaged (specifically, divided by 2) 0.5 LSB results. That is, it is possible to match mechanical stopped position with electrical stopped position with an accuracy of less than a discretization error. Stopped position is shown in FIG. 9 by the white circle that has Lon_Cur_AD meshed.

Next, operation of position detection for the zoom ring 52 will be described using the flowcharts shown in FIG. 10 to FIG. 18. These flowcharts are executed by the CPU 41 controlling each section within the interchangeable lens 100 in accordance with programs stored in the memory 37. It should be noted that when the range ring 51 has been set to RF mode also, it is possible to detect position of the range ring 51 by appropriately modifying this flowchart.

If the flow for position detection commences operation, it is first determined whether or not Tim_AD_Det has elapsed (S1). Here it is determined whether or not an AD update period for position detection of the zoom ring 52 carried out by the A/D converter 44 has elapsed. This AD update period is set in advance as a parameter and stored in the memory 37. If the result of this determination is that the AD update period has not elapsed, a wait state is entered until such time as the AD update period does elapse.

If the result of determination in step S1 is that Tim_AD_Det has elapsed, next AD conversion processing is carried out and Once_AD is updated (S3). Here, AD conversion is carried out by the A/D converter 44, and a conversion value is updated as AD value Once_AD. This AD value Once_AD is an AD conversion value itself that has not been subjected to averaging processing.

If AD conversion processing has been carried out and Once_AD has been updated, next Once_AD is compared with an adjustment value and rounding processing is carried out (S5). Here, AD value Once_AD that was updated in step S3 and a ZM position adjustment value (wide-angle side: ADJ_ZM_LINER_AD_WIDE, Telephoto side: ADJ_ZM_LINER_AD_TELE) are compared, and rounding processing is carried out in accordance with the comparison result. Specifically, if ADJ_ZM_LINER_AD_WIDE<Once_AD, then AD value Once_AD is rounded to ADJ_ZM_LINER_AD_WIDE. On the other hand, if ADJ_ZM_LINER_AD_TELE>Once_AD, then AD value Once_AD is rounded to ADJ_ZM_LINER_AD_TELE. However, this rounding processing is for the case of an interchangeable lens having a relationship where ADJ_ZM_LINER_AD_TELE<ADJ_ZM_LINER_AD_WIDE, and for the case of an interchangeable lens where the size relationship is reversed, rounding processing is carried out by reversing the size relationship.

Once rounding processing has been carried out, next Cur(i)_AD update processing is carried out (S7). Here, moving averaging processing is carried out for the AD value Once_AD that was acquired in step S3 and subjected to rounding processing, to calculate an AD value Cur(i)_AD for which moving averaging has been carried out. This processing will be described using FIG. 11.

Figure 11:
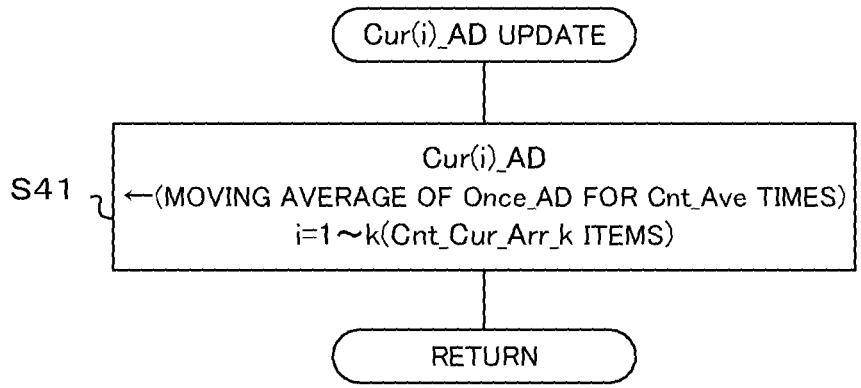
FIG. 11 is a flowchart showing operation for Cur(i)_AD update, in the camera of one embodiment of the present invention.

If the flow for Cur(i)_AD update shown in FIG. 11 is entered, moving average for Once_AD is calculated (Cnt_Ave) times and made Cur(i)_AD (S41). Cnt_Ave times is a number of times for moving average of AD (Once_AD value) that has been acquired, and is stored in advance in the memory 37 as a parameter. In this step the Once_AD value is subjected to moving average Cnt_Ave times, and a Cur(i)_AD value is calculated. In the event that a value after the decimal point arises as a result of the averaging processing, adjustment is performed by rounding off. This averaging processing using moving average is carried out every update period.

i in Cur(i)_AD is an array of Cnt_Cur_Arr_k elements, this Cnt_Cur_Arr_k represents a number of data items that can be stored at one time in a buffer, and k and Cnt_Cur_Arr_k have the same meaning. The subscript i in step S41 changes from 1 to k. k corresponds to Cur(i)_AD that has been calculated from the AD value of the most recent periodic processing. Also, 1 corresponds to Cur(i)_AD before the oldest of the k times of periodic processing. If the Cur(i)_AD processing of step S41 is completed, the originating flow is returned to.

If Cur(i)_AD update has been carried out in step S7, next Sum_Cur_AD update is carried out (S9). Here, two types of accumulated AD value, namely Sum_Cur_For_Del_AD and Sur_Cur_For_Lon_AD, are calculated using moving average AD value Cur(i)_AD. This accumulated AD value corresponds to an area of the slanted line portion in the upper graphs in FIG. 6A and FIG. 6B. This processing will be described using FIG. 12.

Figure 12:
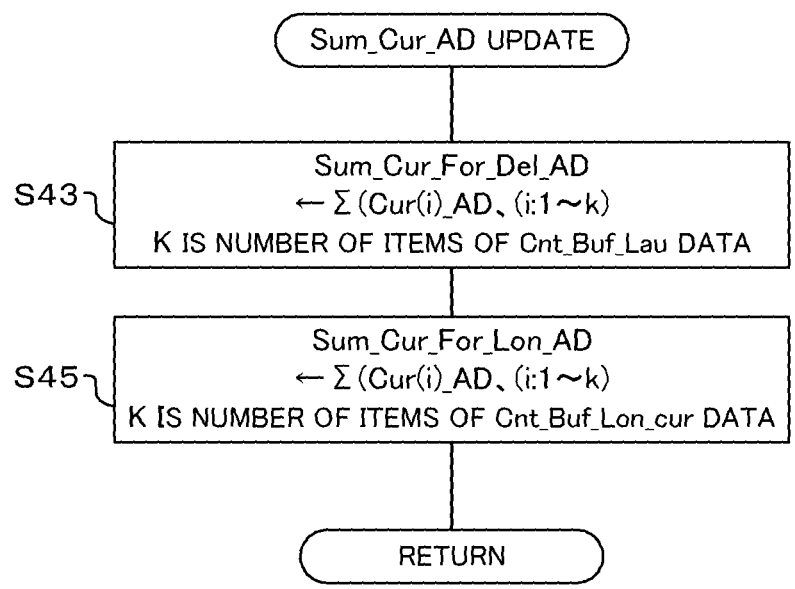
FIG. 12 is a flowchart showing operation for Sum_Cur_AD update, in the camera of one embodiment of the present invention.

If the flow for Sum_Cur_AD update shown in FIG. 12 is entered, first Sum_Cur_For_Del_AD is obtained (S43). Sum_Cur_For_Del_AD is an accumulated AD value used in Del_Sum_AD value calculation, and is the sum of Cnt_Buf_Lau items of Cur(i)_AD, from Cur(1)_AD two Cur(k)_AD. Cnt_Buf_Lau is a number of times accumulation processing is carried out for average AD value (Cur(i)_AD value), and is stored in advance in the memory 37 as a parameter.

If Sum_Cur_For_Del_AD has been calculated in step S43, next Sur_Cur_For_Lon_AD is obtained (S45). Sur_

Cur_For_Lon_AD is the sum of Cnt_Buf_Lon_Cur items of Cur(i)_AD, from Cur(1)_AD two Cur(k)_AD. Cnt_Buf_Lon_Cur is a number of times accumulation processing is carried out for average AD value (Cur(i)_AD value), and is stored in advance in the memory 37 as a parameter. If the Sur_Cur_For_Lon_AD processing of step S45 has been completed, the originating flow is returned to.

If Sum_Cur_AD update has been carried out in step S9, next Del_Cur_AD update is carried out (S11). This Del_Cur_AD corresponds to gradients K11 and K12 in FIG. 8. This update processing will be described using FIG. 13.

Figure 13:
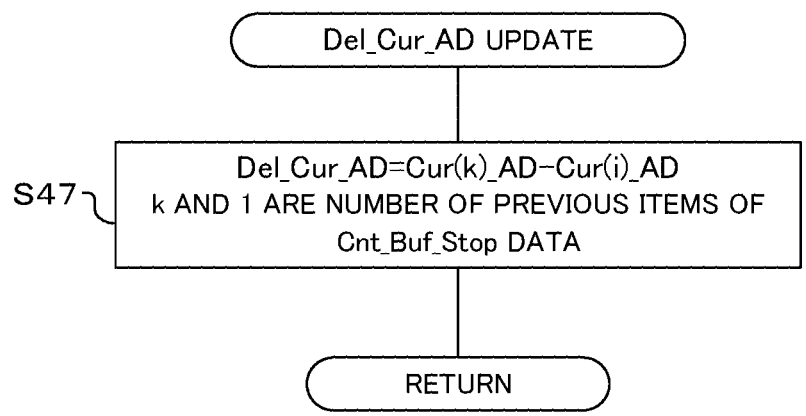
FIG. 13 is a flowchart showing operation for Del_Cur_AD update, in the camera of one embodiment of the present invention.

If the flow for Del_Cur_AD update shown in FIG. 13 is entered, Cur(k)_AD-Cur(1)_AD is calculated (S47). Del_Cur_AD is the value of the difference between Cur(1)_AD for the previous periodic processing (Cnt_Buf_Stop−1) and the newest average AD value. Here, the relationship between k and 1 corresponds to data ahead of previous Cnt_Buf_Stop and the newest data, with Cur(k)_AD being the newest Cur(i)_AD, and Cur(1)_AD being the oldest Cur(i)_AD. If Del_Cur_AD has been calculated in step S47, the originating flow is returned to.

If Del_Cur_AD update has been carried out in step S11, next Del_Sum_AD update is carried out (S13). This Del_Sum_AD is equivalent to area of the slanted line portion of the middle graph in FIG. 8. This update processing will be described using FIG. 14.

If the flow for Del_Sum_AD update in FIG. 14 is entered, Sum_Cur_For_Del_AD−(Cnt_Buf_Lau)*Pre_AD is calculated (S49). Here, Sum_Cur_For_Del_AD was calculated in step S9 (step S43). Also, Cnt_Buf_Lau is a buffer number for storage of AD value (Cur(i)_AD) used at the time of activation determination, and is stored in advance in the memory 37 as a parameter. Pre_AD is a variable for storing the updated AD value (Cur(i)_AD), and is equivalent to the value on the left side of the upper graphs and middle graphs in FIG. 6A and FIG. 6B. If Del_Sum_AD has been calculated in step S49, the originating flow is returned to.

If Del_Sum_AD update has been carried out in step S11, it is next determined whether or not drive is in progress (S15). If operation of the zoom ring 52 by the user is in progress, then the flag Drv_Flag is set to 1 in step S17, while if operation is not in progress the flag Drv_Flag is set to 0 in step S21. In this step S15 determination is based on the flag Drv_Flag.

If the result of determination in step S15 is that drive is not in progress, namely that Drv_Flag=0, operation activation determination processing is carried out (S17). In this state, it is determined whether or not the user has commenced operation of the zoom ring 52 based on output from the A/D converter 44. Detailed operation of this Operation activation determination processing will be described later using FIG. 15.

If operation activation determination processing has been carried out in step S17, it is next determined whether or not activation determination has been performed (S19). Here determination is based on the flag Drv_Flag. If the determination result in step S15 is that drive is not in progress, then in the event that a result of determination processing in step S17 is that the drive flag Drv_Flag=1, it is determined that operation has been activated because drive has commenced from a state where operation has been stopped up to now. If the result of this determination is that there is no activation, namely a case where Drv_Flag=0, the flow for position detection is terminated.

On the other hand, if the result of determination in step S19 is that activation determination has been performed, namely that Drv_Flag=1, operating state position update is carried out (S25). In this case, the fact that there has been a stopped state up to now is a case where there has been activation as a result of user operation (S15 No→S17→S19 Yes), or a case where an operating state continues and the next update period is entered (S15 Yes→S21→S23 Yes). In this step, the flag Drv_Flag=1 is maintained, and update of the updated AD value Pre_AD is carried out. This operating state position update processing will be described using FIG. 17.

Figure 17:
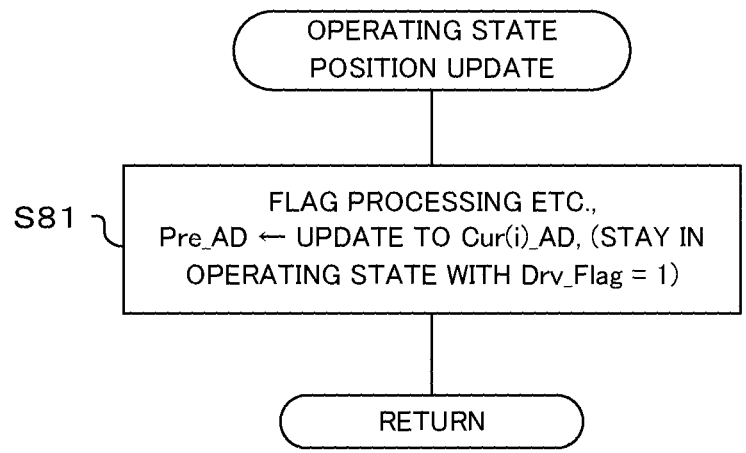
FIG. 17 is a flowchart showing operation of operating state position update, in the camera of one embodiment of the present invention.

If the flow for operating state position update shown in FIG. 17 is entered, flag processing etc. is carried out, and update processing for Pre_AD is carried out (S81). As flag processing, Drv_Flag representing drive state is set to 1 and the operating state is maintained. Also, the newest moving average AD value Cur(i)_AD that was acquired in step S7 is updated as updated AD value Pre_AD. If the operating state position update has been updated this processing flow is completed, and the originating flow is returned to.

Step S15 is returned to, and if the result of determination in this step is that drive is in progress, namely that the flag Drv_Flag=1, operation stop determination processing is carried out (S21). In this state, it is determined whether or not the user has stopped operation of the zoom ring 52 based on output from the A/D converter 44. Detailed operation of this operation stop determination processing will be described later using FIG. 16.

If the operation stop determination processing of step S21 has been carried out, it is next determined whether or not operation is continuing (S23). Here determination is based on the flag Drv_Flag. In the event that the determination result in step S15 is that drive is in progress and the result of determination processing in step S21 is that the drive flag Drv_Flag=1, it is determined that the operating state up to now is continuing, and processing advances to the previously described step S25.

On the other hand, if the result of determination in step S23 is that operation is not continuing, namely that Drv_Flag=0, drive was in progress up to now (S15 Yes) but since the result of the operation stop determination processing was that a stopped state was entered (S21, S23 No) stop state position update processing is carried out (S27). This is a case where there has been an operating state up to now, but there is now a state where the user has stopped operation. In this step, the flag Drv_Flag is reset to 0, and update of the AD value at the time of stop, that was described using FIG. 8 and FIG. 9, is carried out. This stop state position update processing will be described using FIG. 18.

Figure 18:
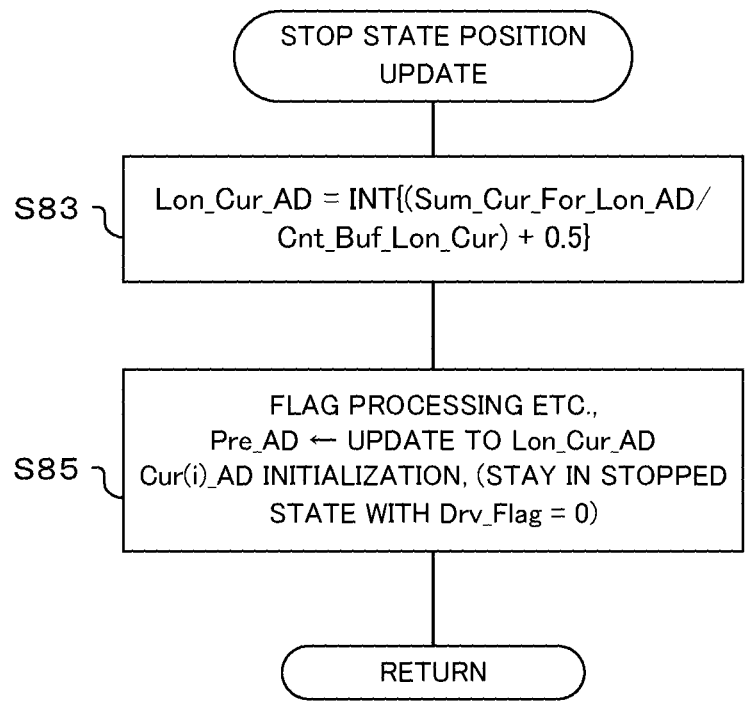
FIG. 18 is a flowchart showing operation of stop state position update, in the camera of one embodiment of the present invention.

If the flow for stop state position update shown in FIG. 18 is entered, first stopped position Lon_Cur_AD is calculated (S83). As shown in FIG. 8, Lon_Cur_AD corresponds to AD value at the time of completion of permissible delay time T12 (white circle that is meshed in FIG. 8). Also, using the equation that was described using FIG. 9, it is possible to match mechanical stopped position with electrical stopped position with an accuracy of less than a discretization error.

If Lon_Cur_AD has been calculated in step S83, next flag processing etc. is carried out (S85). Here, the stopped position Lon_Cur_AD that was calculated in step S83 is replaced as updated AD value Pre_AD. Also, initialization of moving average AD value Cur(i)_AD is carried out. As initialization, array buffers (Cur(k)_AD to Cur(1)_AD) for storing Cnt_Cur_Ark_k items of Cur(i)_AD are replaced with the newest Lon_Cur_AD. Sum_Cur_For_Del_AD, Sur_Cur_For_Lon_AD and Del_Cur_AD are recalculated from the next periodic processing with the replaced Cur(k)_

AD. If the processing of step S83 is complete, the flow for stop state position update is terminated and the originating flow is returned to.

If processing for the stop state position update of step S27 or the operating state position update of step S25 are completed, next Trac-ZMENC is calculated (S29). Here, data representing focal length is calculated based on AD value of the A/D converter 44. Specifically, there is conversion to the focal length data (Trac-ZMENC) based on confirmed AD value Pre_AD. If there has been conversion to focal length data, this is notified (S31). Here, the current focal length data Trac-ZMENC is notified to the CPU 203 within the camera body 200. If Trac-ZMENC calculation has been carried out, the flow for position detection is terminated.

Figure 10:
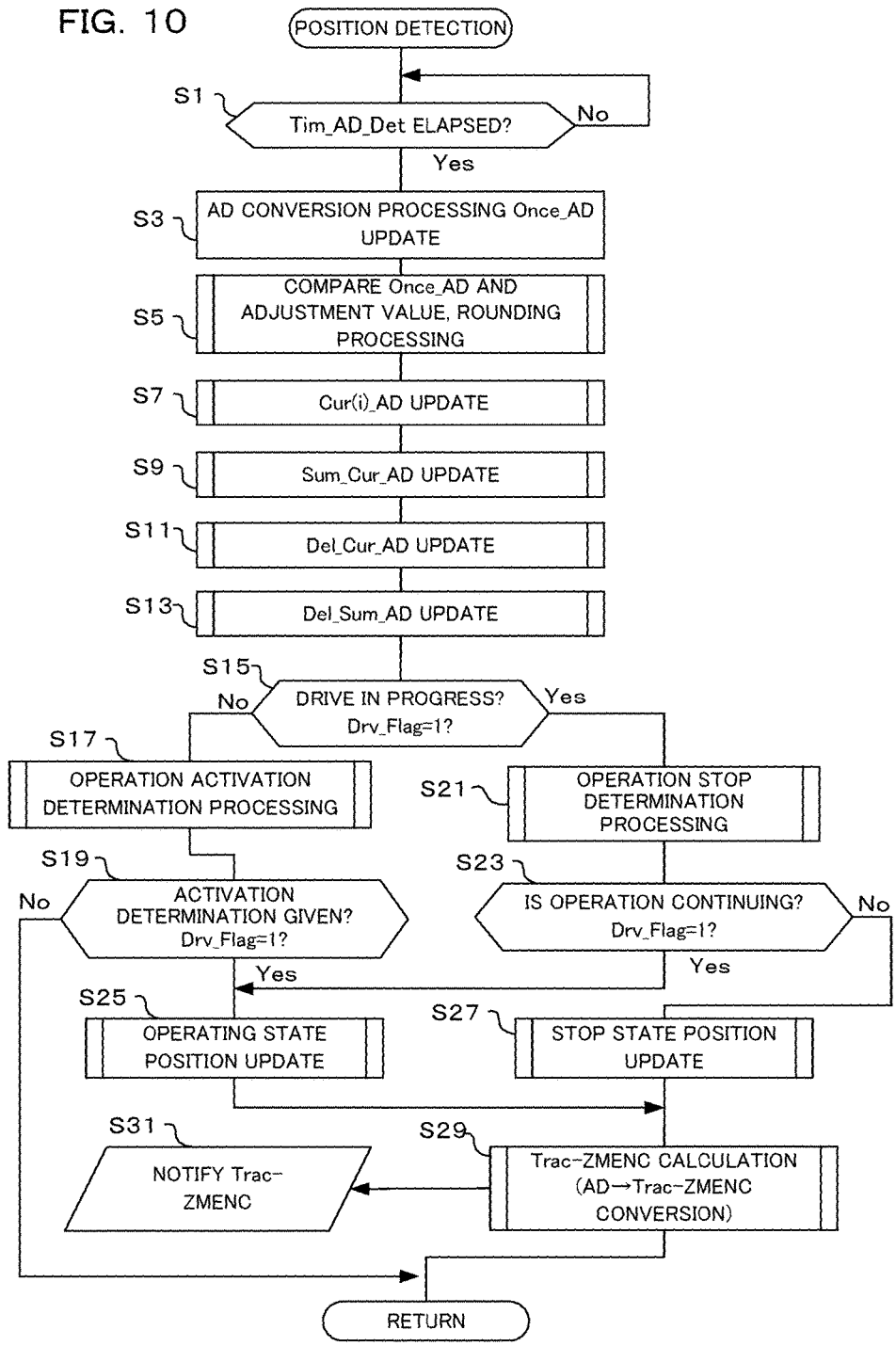
FIG. 10 is a flowchart showing general flow of position detection, in the camera of one embodiment of the present invention.

It should be noted that the flow for position detection that was shown in FIG. 10 has been explained for the case of detecting operation position of the zoom ring 52 using A/D conversion. In the case of setting the range ring 51 to the RF position, steps S1 to S27 are executed using AD values from the A/D converter 43, and if the processing of steps S29 and S31 converts to distance data (1/L/) and not to focal length data (Trac-ZMENC), it is possible to similarly carry out detection of RF position.

Next, detailed operation of the operation activation determination processing in step S17 will be described using the flowchart shown in FIG. 15.

If the flow for operation activation determination processing shown in FIG. 15 is entered, first it is determined whether or not a moving average AD value Cur(i) is smaller than Pre_AD-Lau_Thr2_AD (S51). Here, the moving average AD value Cur(i)_AD that was acquired in step S7 is compared to a difference between confirmed AD value Pre_AD and immediate operation determination value Lau_Thr2_AD that is stored as a parameter in the memory 37. The immediate operation determination value Lau_Thr2_AD is set to a larger value than threshold value Lau_Thr_AD, which will described later, so as to make it possible to more directly determine that a zoom operation has been performed when the zoom ring 52 is moving significantly, by comparing immediate operation determination value Lau_Thr2_AD with moving average AD value Cur(i). This value is a significantly larger value than electrical noise. It should be noted that in the following (Pre_AD-Lau_Thr2_AD) and (Pre_AD+Lau_Thr2_AD) will be referred to as immediate operation determination values.

If the result of determination in step S51 is No, namely that moving average AD value Cur(i) has become smaller than the immediate operation determination value (Pre_AD-Lau_Thr2_AD), it is determined that the zoom ring 52 is not moving significantly. It is therefore next determined whether or not moving average AD value Cur(i) is larger than immediate operation determination value (Pre_AD+Lau_Thr2_AD) (S55). If the result of determination in step S55 is No, it is determined that the zoom ring 52 is not moving significantly.

If the result of determination in step S51 or S55 is Yes, it is determined that the zoom operation ring 52 is moving significantly to the extent that the immediate operation determination value is exceeded, and the flag Drv_Flag is set to 1 as flag processing etc. (S53, S57). Here, since the result of determination is that the system is in the operating state, the Drv_Flag is set to 1. If this flag processing has been carried out, the originating flow is returned to.

If the result of determination in step S55 is No, next, in steps S59 and S63, activation determination is carried out using a differential Sum value Del_Sum_AD, which is the accumulated value for moving average AD value that was described using FIG. 6A and FIG. 6B. It is first determined whether or not the differential Sum value is smaller than the activation determination threshold value (S59). Here it is determined whether or not the differential Sum value Del_Sum_AD is smaller than the value resulting from multiplying threshold value Lau_Thr_AD by −1.

If the result of determination in step S59 is No, it is next determined whether or not the differential Sum value is greater than the activation determination threshold value (S63). Here it is determined whether or not the differential Sum value Del_Sum_AD is greater than the threshold value Lau_Thr_AD.

If the result of determination in step S59 or S63 is Yes, the flag Drv_Flag is set to 1 as flag processing etc. (S61, S65). In this case, since an absolute value of an accumulated value for moving average AD value Cur(i)_AD within a period is larger than the accumulated value of confirmed AD value Pre_AD, as in the example shown in the lowermost graph in FIG. 6B, it can be said that there is a change that is greater than the electrical noise. The operating state is therefore determined and Drv_Flag is set to 1. If this flag processing has been carried out, the originating flow is returned to.

On the other hand, if the result of determination in step S63 is No, then the flag processing etc. is not carried out, specifically, the flag Drv_Flag is maintained at 0 representing the stopped state, and the originating flow is returned to. In this case, an absolute value of accumulated value for moving average AD value Cur(i)_AD within a period and an accumulated value of confirmed AD value Pre_AD are substantially the same, as in the example shown in the lowermost graph in FIG. 6A (difference is within the threshold value). Change is smaller than electrical noise, and it is determined that operation is not being performed.

Next, detailed operation of the operation stop determination processing in step S21 will be described using the flowchart shown in FIG. 16.

Figure 16:
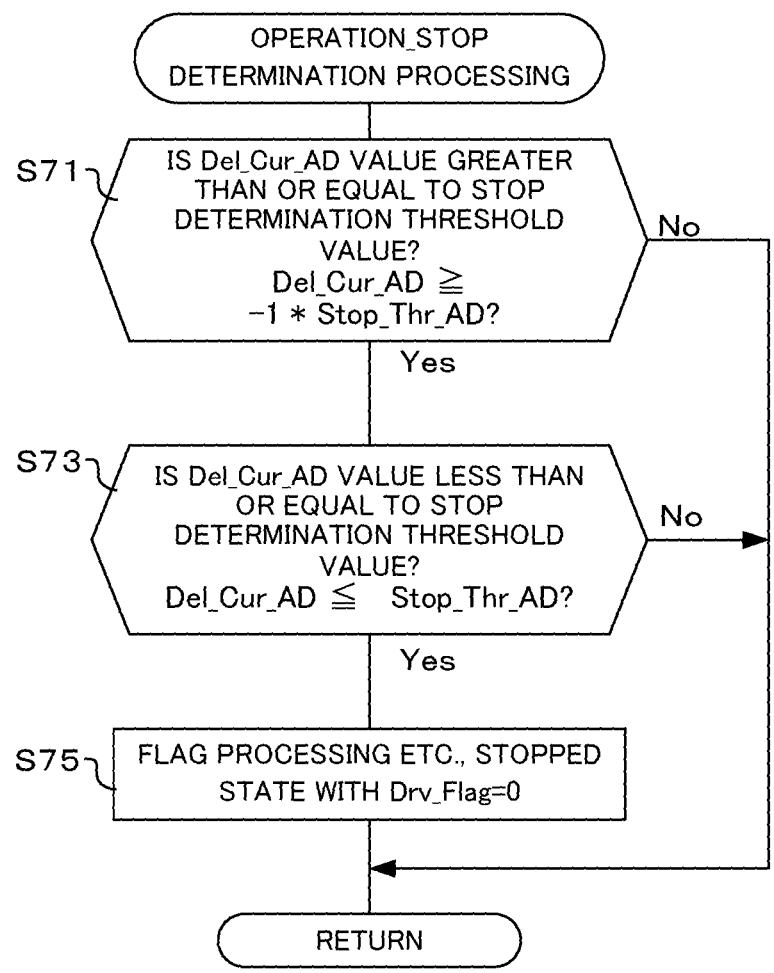
FIG. 16 is a flowchart showing operation for operation_stop determination processing, in the camera of one embodiment of the present invention.

If the flow for operation stop determination processing shown in FIG. 16 is entered, it is first determined whether or not the Del_Cur_AD value is greater than or equal to the stop determination threshold value (S71). Here it is determined whether or not the Del_Cur_AD value, that is equivalent to gradients K11 and K12 in FIG. 8 and was calculated in step S11, is greater than or equal to a value derived by multiplying the threshold value Stop_Thr_AD by −1. If the result of this determination is No, it is determined that gradient K11 is smaller than the threshold value, namely that the gradient is large, and so it is determined not to be stopped, corresponding to the case of a negative gradient for gradient K11 in FIG. 8 (a decline), change in moving average AD value Cur(i)_AD is large and user operation is in progress, and so flag processing is not carried out and the originating flow is returned to.

If the result of determination in step S71 is Yes, it is determined that the gradient K12 is greater than or equal to the threshold value, namely that the gradient is small and operation has stopped, corresponding to a negative gradient (decline) for gradient K12 in FIG. 8. Next, for a positive gradient (increase), it is determined whether or not the Del_Cur_AD value is less than or equal to the stop determination threshold value (S73). Here it is determined whether or not the Del_Cur_AD value, that is equivalent to gradients K11 and K12 in FIG. 8 and was calculated in step S11, is less than or equal to the threshold value Stop_Thr_AD.

If the result of determination in step S73 is No, the gradient K11 is larger than the threshold value, corresponding to inclination K11 in FIG. 8, and so it is determined not be stopped, and since change in moving average AD value Cur(i)_AD is large and it is determined that user operation is in progress, flag processing is not carried out and the originating flow is returned to.

On the other hand, if the result of determination in step S73 is Yes, the inclination K12 is less than or equal to the threshold value and stopped is determined, corresponding to the inclination K12 in FIG. 8, and flag processing is carried out (S75). By comparing the Del_Cur_AD value of the threshold value, it is determined that there has been change from a drive state to a stopped state so the flag Drv_Flag is set to 0 representing the stopped state. If flag processing has been carried out, the originating flow is returned to.

As has been described above, with the position detection device of one embodiment of the present invention, A/D conversion is executed at given time intervals by an A/D converter (refer, for example, to S51 in FIG. 15), and position of a member is detected based on a digital value. When it is determined that a member is stopped, an average value of a first number of digital values is compared with a first threshold value, and it is determined that the member is moving if it has been determined that the average value is greater than the first threshold value (refer, for example, to S15 No and S17 in FIG. 10, and S59 and S63 in FIG. 15). Also, when it is determined that the member is moving, a difference between a newest digital value and a digital value that was acquired a second number previously is compared with a second threshold value, and it is determined that the member has stopped if it is determined that the difference is smaller than the second threshold value (refer, for example, to S15 Yes and S21 in FIG. 10, and S71 and S73 in FIG. 16).

This way, with one embodiment of the present invention it is possible to improve positional accuracy with a simple method. Specifically, since an average value of a plurality of AD values that have been subjected to A/D conversion are compared with a threshold value, it is possible to improve positional accuracy regardless of electrical noise. Also, since a difference between a plurality of AD values is compared with a threshold value, it is possible to improve positional accuracy regardless of electrical noise in this case also.

It should be noted that with the one embodiment of the present invention, description has been given for an example where a slider type resistor has been used as detection element that outputs an analog signal (refer to FIG. 3A and FIG. 3B). However, the detection element is not limited to a resistor as long as it is possible to output an analog signal in accordance with position of a movable member and it is possible, for example, to have a detection element such as a capacitor, and detection is not limited to voltage, and current etc. may be detected, and it is also possible to detect a physical quantity such as magnetism.

Also, with the one embodiment of the present invention, description has been given for an example where a range ring and a zoom ring have been adopted as an operation member, but as a position detection device it is also possible to provide only one or the other, and the present invention is not limited to being an operation member within a lens barrel, and it is possible, for example, to adopt other operation members for the user to manually input settings, such as an aperture value setting member, shutter speed setting member etc.

Also, with the one embodiment of the present invention description has been give for an example where position detection is carried out by subjecting an analog signal to A/D conversion. However, this is not limiting and it is also possible to apply the present invention to a case where a pulse signal corresponding to movement of an operation member is detected, using a photo interrupter or the like. Specifically, in a case where edge signals are output even with slight movement, edge signals are detected in response to change the user does not intend. In this case, as with this embodiment, an accumulated value and gradient etc. for a number of edges within a given time are calculated, and the determination of operating state and stopped state can be carried out. For example, this embodiment can be adopted in detection of movement of a range ring in the event that manual focus mode (MF mode) has been set.

Also, with the one embodiment of the present invention, the control section has been realized by the CPU 41, but besides a CPU, or in addition to a CPU, it is possible to have a hardware structure such as gate circuits generated based on a programming language that is described using Verilog, and also to use a hardware structure that utilizes software such as a DSP (digital signal processor). Suitable combinations of these approaches may also be used.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., or a medical camera, or a camera for a scientific instrument such as a microscope, a camera for mounting on a vehicle, a surveillance camera etc. In any event, it is possible to adopt the present invention as long as a device is for taking photographs by means of a manual rotation operation.

Also, the one embodiment of the present invention is directed to an imaging apparatus. However, the present invention is not limited to an imaging apparatus and can also be applied to position detection of a rotating operation member where position detection is carried out with high accuracy, in other devices such as in a medical instrument or optical instrument. Also, when carrying out medical remote control procedures, the present invention can also be applied to position detection of an operation member for surgery while a doctor is observing remote imagery.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus having a lens, that is capable of movement in an optical axis direction, provided inside a lens barrel that includes a photographing lens, comprising:
    an operation member,
    a detection element that outputs analog signals in accordance with position of the operation member,
    an A/D converter that carries out A/D conversion to convert the analog signals to digital values, and
    a controller that causes execution of A/D conversion by the A/D converter at a given time intervals, detects position of the operation member based on the digital values, and controls position of the lens based on the position, wherein
    the controller, when it is determined that the operation member is stopped, compares an average value of a first number of digital values with a first threshold value, and determines that the operation member is moving if it has been determined that the average value is greater than the first threshold value, and
    the controller, when it is determined that the operation member is moving, compares a difference between a newest digital value and a digital value that was acquired a second number previously with a second threshold value, and determines that the operation member has stopped if it is determined that the difference is smaller than the second threshold value.

2. The imaging apparatus of claim 1, wherein:
    the controller, when it is determined that the operation member is stopped, compares a newest digital value with a third threshold value that is larger than the first threshold value, and determines that the operation member is moving if the newest digital value is larger than the third threshold value.

3. The imaging apparatus of claim 1, wherein:
    the controller, when it is determined that the operation member is moving, updates an average value of a third number of digital values, the third number being smaller than the first number, as position of the member.

4. The imaging apparatus of claim 1, wherein:
    the controller, after having determined that the operation member has stopped, makes an average value of a fourth number of digital values a stopped position.

5. The imaging apparatus of claim 4, wherein:
    the controller determines the first threshold value based on the stopped position.

6. The imaging apparatus of claim 4, wherein:
    the controller determines the third threshold value based on the stopped position.

7. The imaging apparatus of claim 1, wherein:
    the lens is a focus adjustment lens.

8. The imaging apparatus of claim 1, wherein:
    the lens is a zoom lens.

9. The imaging apparatus of claim 1, wherein:
    the operation member is provided on the lens barrel.

10. A position detection method, for a position detection device having a detection element that outputs analog signals in accordance with position of a movable member, and an A/D converter that carries out A/D conversion to convert the analog signals to digital values, that causes execution of A/D conversion by the A/D converter at given time intervals, and detects position of the member based on the digital values, comprising:
    when it is determined that the member is stopped, comparing an average value of a first number of digital values with a first threshold value, and determining that the member is moving if it has been determined that the average value is greater than the first threshold value, and
    when it is determined that the member is moving, comparing a difference between a newest digital value and a digital value that was acquired a second number previously with a second threshold value, and determining that the member has stopped if it is determined that the difference is smaller than the second threshold value.

11. The position detection method of claim 10, further comprising:
    when it is determined that the member is stopped, comparing a newest digital value with a third threshold value that is larger than the first threshold value, and determining that the member is moving if the newest digital value is larger than the third threshold value.

12. The position detection method of claim 10, further comprising:
    when it is determined that the member is moving, updating an average value of a third number of digital values, the third number being smaller than the first number, as position of the member.

13. The position detection method of claim 10, further comprising:
    after determining that the member is stopped, making an average value of a fourth number of digital values a stopped position.

14. The position detection method of claim 13, further comprising:
    determining the first threshold value based on the stopped position.

15. The position detection method of claim 13, further comprising:
    determining the third threshold value based on the stopped position.

16. A non-transitory computer readable storage medium storing a program that causes execution of a position detection method by a computer that is provided in a position detection device having a detection element that outputs analog signals in accordance with position of a movable member, and an A/D converter that carries out A/D conversion to convert the analog signals to digital values, the position detection method comprising:
    when it is determined that the member is stopped, comparing an average value of a first number of digital values with a first threshold value, and determining that the member is moving if it has been determined that the average value is greater than the first threshold value, and
    when it is determined that the member is moving, comparing a difference between a newest digital value and a digital value that was acquired a second number previously with a second threshold value, and determining that the member has stopped if it is determined that the difference is smaller than the second threshold value.

17. In the non-transitory computer readable storage medium of claim 16, the position detection method further comprising:

when it is determined that the member is stopped, comparing a newest digital value with a third threshold value that is larger than the first threshold value, and determining that the member is moving if the newest digital value is larger than the third threshold value.

18. In the non-transitory computer readable storage medium of claim 16, the position detection method further comprising:

when it is determined that the member is moving, updating an average value of a third number of digital values, the third number being smaller than the first number, as position of the member.

19. In the non-transitory computer readable storage medium of claim 16, the position detection method further comprising:

after determining that the member is stopped, making an average value of a fourth number of digital values a stopped position.

20. In the non-transitory computer readable storage medium of claim 19, the position detection method further comprising:

determining the first threshold value based on the stopped position.

* * * * *